US012683401B2

(12) United States Patent
Klaassen et al.

(10) Patent No.: US 12,683,401 B2
(45) Date of Patent: Jul. 14, 2026

(54) CARBON-NEUTRAL ECO-REFINERY UTILIZING INTERNAL THERMAL ENERGY

(71) Applicant: The Claire Technologies Corporation, Danville, CA (US)

(72) Inventors: Alan W Klaassen, Kensington, CA (US); Steven F. Sciamanna, Orinda, CA (US); Paul A. Allinson, Danville, CA (US)

(73) Assignee: Claire Technologies Licensing, LLC, Salt Lake City, UT (US)

( * ) Notice: Subject to any disclaimer, the term of this patent is extended or adjusted under 35 U.S.C. 154(b) by 921 days.

(21) Appl. No.: 17/895,090

(22) Filed: Aug. 25, 2022

(65) Prior Publication Data

US 2023/0002690 A1    Jan. 5, 2023

Related U.S. Application Data

(63) Continuation of application No. 17/876,894, filed on Jul. 29, 2022, and a continuation of application No.

(Continued)

(51) Int. Cl.
| | |
|---|---|
| *F28D 20/00* | (2006.01) |
| *C01B 3/0015* | (2026.01) |
| *H02J 3/28* | (2026.01) |

(52) U.S. Cl.
CPC .............. *H02J 3/28* (2013.01); *C01B 3/0015* (2013.01); *F28D 20/0034* (2013.01); *Y02E 60/32* (2013.01)

(58) Field of Classification Search
CPC .. Y02E 60/14; H01M 8/04052; C01B 3/0015; C01B 3/22; C01B 2203/1211
See application file for complete search history.

(56) References Cited

U.S. PATENT DOCUMENTS

| | | | |
|---|---|---|---|
| 10,396,388 B2 | 8/2019 | Bosmann et al. | |
| 2004/0211407 A1* | 10/2004 | Terashima | ............ F28D 20/028 |
| | | | 126/400 |

(Continued)

FOREIGN PATENT DOCUMENTS

| | | |
|---|---|---|
| CN | 106542955 A | 3/2017 |
| WO | 2014044706 A1 | 3/2014 |

(Continued)

OTHER PUBLICATIONS

"Scope 1 and Scope 2 Inventory Guidance", EPA, United States Environmental Protection Agency, Retrieved from https://www.epa.gov/climateleadership/scope-1-and-scope-2-inventory-guidance, 6 pages.

(Continued)

*Primary Examiner* — Imran Akram
(74) *Attorney, Agent, or Firm* — Patterson + Sheridan, LLP

(57) ABSTRACT

Apparatus, means and methods of converting existing refineries and hydrocarbon processing facilities to ecologically friendly refineries ("eco-refinery") are disclosed that employ heat and stored thermal energy for their internal processes to enable the overall operation of the facilities under improved environmental and carbon-neutral conditions. Also disclosed are the use of liquid organic hydrocarbon carriers (LOHC) to generate heat, hydrogen, and electricity under carbon-neutral conditions to power partially or wholly converted refineries and eco-refineries to enable the efficient use of clean energy sources and prevent the release of carbon dioxide to the environment. Also disclosed is a novel ecosystem for replacing traditional hydrocarbon fuels with LOHC materials for use internally within carbon-neutral refineries and also tailorable as alternative recyclable fuels to power mobile transportation systems and stationary facilities to enable their operation under overall carbon-neutral conditions with respect to the environment. Also disclosed is (Continued)

the use of eco-refineries to function as large-scale thermal energy storage systems and as liquid chemical batteries employing LOHC materials to store energy in the form of available heat and labile hydrogen when importing excess electrical energy from the grid and using stored thermal energy to generate and export needed electrical energy to the grid when deficit.

19 Claims, 5 Drawing Sheets

Related U.S. Application Data

17/733,667, filed on Apr. 29, 2022, now abandoned, and a continuation of application No. 17/876,894, filed on Jul. 29, 2022, and a continuation of application No. 17/733,667, filed on Apr. 29, 2022, now abandoned, and a continuation of application No. 17/733,549, filed on Apr. 29, 2022, now abandoned, and a continuation of application No. 17/684,118, filed on Mar. 1, 2022, now Pat. No. 11,848,468, and a continuation of application No. 17/497,903, filed on Oct. 9, 2021, now Pat. No. 11,848,467, and a continuation of application No. 17/488,867, filed on Sep. 29, 2021, now Pat. No. 11,817,610.

(60) Provisional application No. 63/233,330, filed on Aug. 16, 2021, provisional application No. 63/181,969, filed on Apr. 30, 2021, provisional application No. 63/181,968, filed on Apr. 30, 2021, provisional application No. 63/155,741, filed on Mar. 3, 2021, provisional application No. 63/091,425, filed on Oct. 14, 2020, provisional application No. 63/088,024, filed on Oct. 6, 2020.

(56) References Cited

U.S. PATENT DOCUMENTS

| | | | | |
|---|---|---|---|---|
| 2005/0034477 | A1* | 2/2005 | Hu | B64D 13/00 |
| | | | | 62/3.3 |
| 2008/0022683 | A1* | 1/2008 | Ohler | F02C 7/10 |
| | | | | 60/645 |
| 2008/0305371 | A1 | 12/2008 | Hermann et al. | |
| 2009/0246575 | A1 | 10/2009 | Zhao et al. | |
| 2010/0205958 | A1* | 8/2010 | Ishii | F01N 5/02 |
| | | | | 165/104.11 |
| 2011/0100611 | A1* | 5/2011 | Ohler | F01K 3/12 |
| | | | | 165/104.28 |
| 2012/0180554 | A1 | 7/2012 | Leggett et al. | |
| 2013/0305598 | A1 | 11/2013 | Hamilton et al. | |
| 2013/0331616 | A1 | 12/2013 | Olah et al. | |
| 2014/0224295 | A1* | 8/2014 | Yazawa | F24S 90/00 |
| | | | | 136/248 |
| 2015/0266731 | A1 | 9/2015 | Boesmann et al. | |
| 2016/0214858 | A1 | 7/2016 | Cooper et al. | |
| 2016/0289142 | A1 | 10/2016 | Zubrin et al. | |
| 2016/0301093 | A1* | 10/2016 | Bosmann | H01M 8/04201 |
| 2016/0312663 | A1* | 10/2016 | Barmeier | F01K 3/00 |
| 2017/0210204 | A1* | 7/2017 | Fuse | B60H 1/06 |
| 2017/0263954 | A1* | 9/2017 | Shaikh | H01M 8/04701 |
| 2018/0053957 | A1 | 2/2018 | Pez et al. | |
| 2018/0219237 | A1* | 8/2018 | Shaikh | H01M 8/04723 |
| 2018/0375137 | A1* | 12/2018 | Hoffmann | H01M 8/0618 |
| 2019/0153284 | A1* | 5/2019 | Meroueh | F03G 6/068 |
| 2019/0309904 | A1* | 10/2019 | Kusche | F17C 11/005 |
| 2020/0071619 | A1 | 3/2020 | Humphreys et al. | |
| 2020/0094933 | A1 | 3/2020 | Ouchi | |
| 2020/0362217 | A1* | 11/2020 | Sandhage | C09K 5/12 |
| 2021/0276862 | A1* | 9/2021 | Bösmann | B01J 19/0066 |
| 2021/0316269 | A1* | 10/2021 | Gabler | B01J 19/249 |
| 2022/0042718 | A1* | 2/2022 | Liu | F25B 30/06 |
| 2022/0109175 | A1 | 4/2022 | Allinson et al. | |
| 2022/0285714 | A1 | 9/2022 | Klaassen et al. | |

FOREIGN PATENT DOCUMENTS

| | | | |
|---|---|---|---|
| WO | 2015075045 | A1 | 5/2015 |
| WO | 2015075046 | A1 | 5/2015 |
| WO | 2018035056 | A1 | 2/2018 |
| WO | 2018107204 | A1 | 6/2018 |
| WO | 2019211300 | A1 | 11/2019 |
| WO | 2020018972 | A1 | 1/2020 |
| WO | 2022076219 | A1 | 4/2022 |
| WO | 2022119643 | A2 | 6/2022 |

OTHER PUBLICATIONS

"Scope 3 Inventory Guidance", EPA, United States Environmental Protection Agency, Retrieved from https://19january2021snapshot. epa.gov/climateleadership/scope-3-inventory-guidance_.html, 4 pages.
"High Operating Temperature Liquid Metal Heat Transfer Fluids", SunShot, U.S. Department of Energy, Dec. 2012, 1 page.
Muller et al., "Energy Storage by CO2 Methanization and Energy Carrying Compounds: A Thermodynamic Comparison", 2011, 24 pages.
Eypasch et al., "Model-based techno-economic evaluation of an electricity storage system based on Liquid Organic Hydrogen Carriers", Applied Energy, vol. 185, Part 1, 2017, pp. 320-330.
Bruckner et al., "Evaluation of Industrially Applied Heat-Transfer Fluids as Liquid Organic Hydrogen Carrier Systems", vol. 7, No. 1, pp. 229-235.
Modisha et al., "The Prospect of Hydrogen Storage Using Liquid Organic Hydrogen Carriers", Energy & Fuels, vol. 33, Issue 4, 2019, pp. 2778-2796.

* cited by examiner

CARBON-NEUTRAL ECO-REFINERY UTILIZING INTERNAL THERMAL ENERGY

PRIORITY

This application claims the benefit of the priority of U.S. utility patent application Ser. No. 17/876,894, entitled "Heat Integration For Generating Carbon-Neutral Electricity", filed on Jul. 29, 2022; the benefit of the priority of U.S. provisional patent application Ser. No. 63/233,330, entitled "Energy Balanced Process for Producing Carbon-Neutral Electricity", filed on Aug. 16, 2021; the benefit of the priority of U.S. utility patent application Ser. No. 17/733,667, entitled "Method For Making An Improved LOHC From Refinery Streams", filed on Apr. 29, 2022; the benefit of the priority of U.S. provisional patent application Ser. No. 63/181,969, entitled "Method For Making An Improved LOHC From Refinery Streams", filed on Apr. 30, 2021; the benefit of the priority of U.S. utility patent application Ser. No. 17/733,549, entitled "Fueling Station For Supply Of Liquid Organic Hydrogen Carriers And Method of Operation", filed on Mar. 29, 2022; the benefit of the priority of U.S. provisional patent application Ser. No. 63/181,968, entitled "Fueling Station For Supply Of Liquid Organic Hydrogen Carriers And Method of Operation", filed on Mar. 30, 2021; the benefit of the priority of International utility patent application Serial No. PCT/US2022/018362, entitled "Liquid Carbon-Neutral Energy Facility System", filed on Mar. 1, 2022; the benefit of the priority of U.S. utility patent application Ser. No. 17/684,118, entitled "Liquid Carbon-Neutral Energy Facility System", filed on Mar. 1, 2022; the benefit of the priority of U.S. provisional patent application Ser. No. 63/155,741, entitled "A Carbon-Neutral Energy Facility (CNEF) Business Method", filed on Mar. 3, 2021; the benefit of the priority of International utility patent application Serial No. PCT/US2021/0543233, entitled "Carbon-Neutral Process for Generating Electricity", filed on Oct. 9, 2021; the benefit of the priority of U.S. utility patent application Ser. No. 17/497,903, entitled "Carbon-Neutral Process for Generating Electricity", filed on Oct. 9, 2021; the benefit of the priority of U.S. provisional patent application Ser. No. 63/091,425, entitled "Carbon-Neutral Process for Generating Electricity", filed on Oct. 14, 2020; the benefit of the priority of International utility patent application Serial No. PCT/US2021/052553, entitled "Carbon-Neutral Process for Generating Electricity", filed on Sep. 29, 2021; the benefit of the priority of U.S. utility patent application Ser. No. 17/488,867, entitled "Carbon-Neutral Process for Generating Electricity", filed on Sep. 29, 2021; and the benefit of the priority of U.S. provisional patent application Ser. No. 63/088,024, entitled "Carbon-Neutral Process for Generating Electricity", filed on Oct. 6, 2020; all of which are hereby incorporated in their entirety by reference herein.

FIELD

This present disclosure relates generally to a carbon-neutral (CN) hydrocarbon processing facility ("eco-refinery") operating as a system and the associated apparatus, methods, and processes for the processing of fossil fuels and hydrocarbons under conditions of overall carbon-neutrality with respect to the environment. The present disclosure further generally relates to new facilities and conventional refineries that have been wholly or partially converted to operate using internally generated heat derived from external electricity, and heat and electricity obtained from liquid organic hydrogen carriers acting as a source of labile hydrogen. The present disclosure also relates to the use of internal thermal energy to reduce and eliminate the need to combust hydrocarbons as a heat source in order to improve the overall carbon neutral footprint of new and existing hydrocarbon processing facilities. The present disclosure also relates generally to the use of eco-refineries to function as large-scale thermal heat and liquid chemical batteries employing liquid organic hydrogen carriers to store energy in the form of heat and as available labile hydrogen when importing excess electrical energy from the grid and exporting needed electrical energy to the grid when deficit.

BACKGROUND

Conventional hydrocarbon processing facilities use large amounts of electrical and fossil fuel combustion energy in their operations to process and convert fossils fuels, including petroleum, coal, natural gas and orimulsion (a bitumen-based water suspension) to useful products and fuels. Fossil fuels are not considered to be "green" or environmentally neutral materials owing to the amount of carbon dioxide released to the environment during their extraction, transportation, processing and conversion to products, and the requisite use of fuels and electricity used in these processing steps. In addition, conventional hydrocarbon processing facilities combust hydrocarbons to produce needed heat and thermal energy for internal operations and thus release carbon dioxide to the environment, and waste a valuable source of energy, e.g. heat and thermal energy typically escaping the facility or deliberately released by cooling towers, redirected to cooling ponds, released in the form of steam or water vapor for cooling to maintain operating temperatures within the various processing units within the facility. While not directly impacting the environment, the loss of this collective heat and thermal energy requires the substitution of energy, either from electricity or the burning of fossil fuels by means of furnaces, to generate heat, hot water and steam that is used in the facilities for processing the raw fossil fuels and refined hydrocarbon products.

The 2016 Paris Accord Agreement identified a net zero greenhouse gas emissions goal by 2050. This target requires the elimination of non-carbon-neutral emissions in three stages, including Scope 1 that requires facilities to be operated in a carbon-neutral (CN) mode, Scope 2 that requires suppliers of goods and services to facilities to be CN; and Scope 3 that requires end-use of goods and services to be CN.

As a result, under Scope 1 and 2, there is a need for an improved hydrocarbon processing facility and its associated process units that can better control and reserve thermal energy to improve the overall efficiency of the facility, and more significantly aid in reducing the need for external energy sources, so as to provide for facilities with zero or lowered carbon dioxide production, i.e. a facility that is carbon-neutral (CN) with respect to the environment when the overall energy balance of the facility is taken into account.

There is also a need under Scope 3 to replace conventional hydrocarbon fuels, such as gasoline, diesel, and jet fuels and the like that are simply burnt to power internal combustion engines, turbines and jet turbines for transportation means and electrical energy generation resulting in the production of carbon dioxide that is released to the environment as a greenhouse gas.

SUMMARY

The present disclosure discloses multiple embodiments of apparatus, methods, processes, and systems that may be employed to construct or convert existing hydrocarbon processing facilities to better utilize heat and thermal energy to achieve zero or near-zero carbon emissions resulting in an overall improved carbon-neutral footprint with regard to the environment.

The present disclosure further discloses multiple embodiments employing the use of green electricity from the grid to generate heat and store thermal energy for use within a hydrocarbon processing facility that replaces the need for the combustion of hydrocarbons to generate heat for use in internal processes, as well as apparatus and means to capture, store, transfer and utilize thermal energy for use in the internal processes to improve the overall carbon neutral (CN) footprint of hydrocarbon processing facilities and prevent the waste of resources.

The present disclosure also discloses multiple embodiments employing the use of liquid organic hydrocarbon compounds (LOHC) to generate heat and thermal energy and hydrogen for use within a carbon-neutral hydrocarbon processing facility, and further to generate or store thermal energy, electrical energy, and hydrogen associated with the internal processes.

The present disclosure more specifically describes the use of carbon neutral materials and LOHC compounds used with existing and new dehydrogenation equipment, and reversible fuel cells, such as but not limited to solid oxide fuel cells (SOFC) that enable the converted hydrocarbon processing facilities to function as large-scale liquid batteries employing the generated LOHC compounds to capture and generate carbon-neutral electricity at utility grid scale as well as for internal operations. For example, during periods of low-cost renewable energy, the converted refinery and hydrocarbon processing facility would import electricity for green hydrogen electrolysis, generation of LOHC materials by hydrogenation and process heating produced or generated by induction heating using the available carbon-neutral electricity or internally stored electricity and captured thermal energy. As a further example, excess hydrogen would be stored in the form of regenerated or labile hydrogen rich LOHC (R-LOHC) for internal use and for export in the form of tailored carbon-neutral fuels to replace conventional hydrocarbon fuels such as gasoline, diesel, and the like.

The present disclosure more specifically discloses multiple embodiments employing the use of liquid organic hydrocarbon compounds (LOHC) to generate heat and thermal energy for use within a carbon-neutral hydrocarbon processing facility, using sources of green electricity, green hydrogen and internally generated hydrogen to store labile hydrogen within the LOHC materials for use internally within the facility, and further to produce tailored LOHC materials useful as fuels for use in ground transportation, commercial transportation and utilities to convert them to operating under carbon-neutral conditions utilizing tailored LOHC materials rather than conventional fuels such as gasoline, diesel, jet fuel and the like.

The present disclosure more specifically discloses multiple embodiments employing the use of liquid organic hydrocarbon compounds (LOHC) in association with a LOHC recycle unit to collect, store and use available sources of clean energy, including green hydrogen, green electricity and carbon-neutral materials by means of converting them to stored labile hydrogen in the form of recycle LOHC, stored heat, thermal energy and electricity via various battery storage technologies for use by the LOHC recycle unit within the converted carbon-neutral hydrocarbon processing facility and its associated process units.

The present disclosure more specifically discloses multiple embodiments employing the use of liquid organic hydrocarbon compounds (LOHC) in association with a LOHC recycle unit to collect, store and use heat and thermal energy generated therein by means of a heat transfer liquid (HTF) and associated HTF control units, fluid circulation loops, valves, pumps and HTF exchangers to repurpose the use of the thermal energy for internal operation of the LOHC recycle unit and the converted carbon-neutral hydrocarbon processing facility and its associated process units.

Accordingly, one embodiment of the present disclosure includes the use of electrical energy to electrolyze water to generate green hydrogen for use as a hydrogen source and for thermal energy for processes requiring heat, preferably employing sources of green electricity when available, and alternatively generating internal green energy during periods of renewable energy shortage by means of hydrogen powered fuel cells that utilize the labile hydrogen content in LOHC materials, including those manufactured within the LOHC recycle unit and by dehydrogenation of fuels such as EzH$_2$™, a product of and registered trademark of the Claire Technologies Corporation, 4115 Blackhawk Plaza Circle, Suite 100, Danville, Calif., 94506, USA. In further related embodiments, LOHC and fuels such as EzH$_2$™ (a trademark of the Claire Technologies Corporation) may be supplied by the LOHC recycle unit for export or used internally to generate heat, electricity, hydrogen, and other associated byproducts that can be exported or repurposed for use within the facilities and its association process units.

Further embodiments of the present disclosure describe apparatus, means and processes to construct and convert existing hydrocarbon processing facilities to carbon-neutral facilities that may continue to process fossil fuels under carbon-neutral conditions and in addition to generate carbon-neutral electricity and carbon-neutral LOHC materials for use as alternative fuels and sources of labile hydrogen, but operating under improved carbon-neutral conditions.

Embodiments of the present disclosure will enable refinery and hydrocarbon processing facility furnaces to be replaced by HTF heat exchangers using heat exchange fluids (HTF) that can capture, store, and redirect otherwise wasted heat and thermal energy for use within the facilities to achieve an improved or overall carbon-neutral footprint.

Further embodiments of the present disclosure enable the replacement of conventional furnaces, which directly release carbon dioxide to the environment, by apparatus, methods and process that are carbon-neutral in operation and help reduce carbon dioxide emission, and wasted thermal energy, thus enabling the reduction and sequestration of carbon dioxide to attain Paris Accord Scope 1 and Scope 2 compliance status.

Scope 1 emissions are direct greenhouse (GHG) emissions that occur from sources that are controlled or owned by an organization (e.g., emissions associated with fuel combustion in boilers, furnaces, vehicles). Scope 2 emissions are indirect GHG emissions associated with the purchase of electricity, steam, heat, or cooling. Although scope 2 emissions physically occur at the facility where they are generated, they are accounted for in an organization's GHG inventory because they are a result of the organization's energy use. (see EPA "Scope 1 and Scope 2 Inventory Guidance" at the website corresponding to "www.epa.gov/climateleadership/ghg-inventory-development-process-and-guidance").

Further related embodiments of the present disclosure enable a gradual transition to all CN products that will allow the converted hydrocarbon processing facilities to attain Paris Accord Scope 3 compliance status over time as CN LOHC materials, CN electricity and products are used to replace conventional electricity, hydrocarbon fuels such as gasoline, diesel, jet fuel and the like.

Scope 3 emissions are the result of activities from assets not owned or controlled by the reporting organization, but that the organization indirectly impacts in its value chain. Scope 3 emissions include all sources not within an organization's scope 1 and 2 boundary. The scope 3 emissions for one organization are the Scope 1 and 2 emissions of another organization. Scope 3 emissions, also referred to as value chain emissions, often represent the majority of an organization's total GHG emissions. (see EPA "Scope 3 Inventory Guidance" at the website corresponding to "www.epa.gov/climateleadership/scope-3-inventory-guidance").

GLOSSARY

Figure 1:
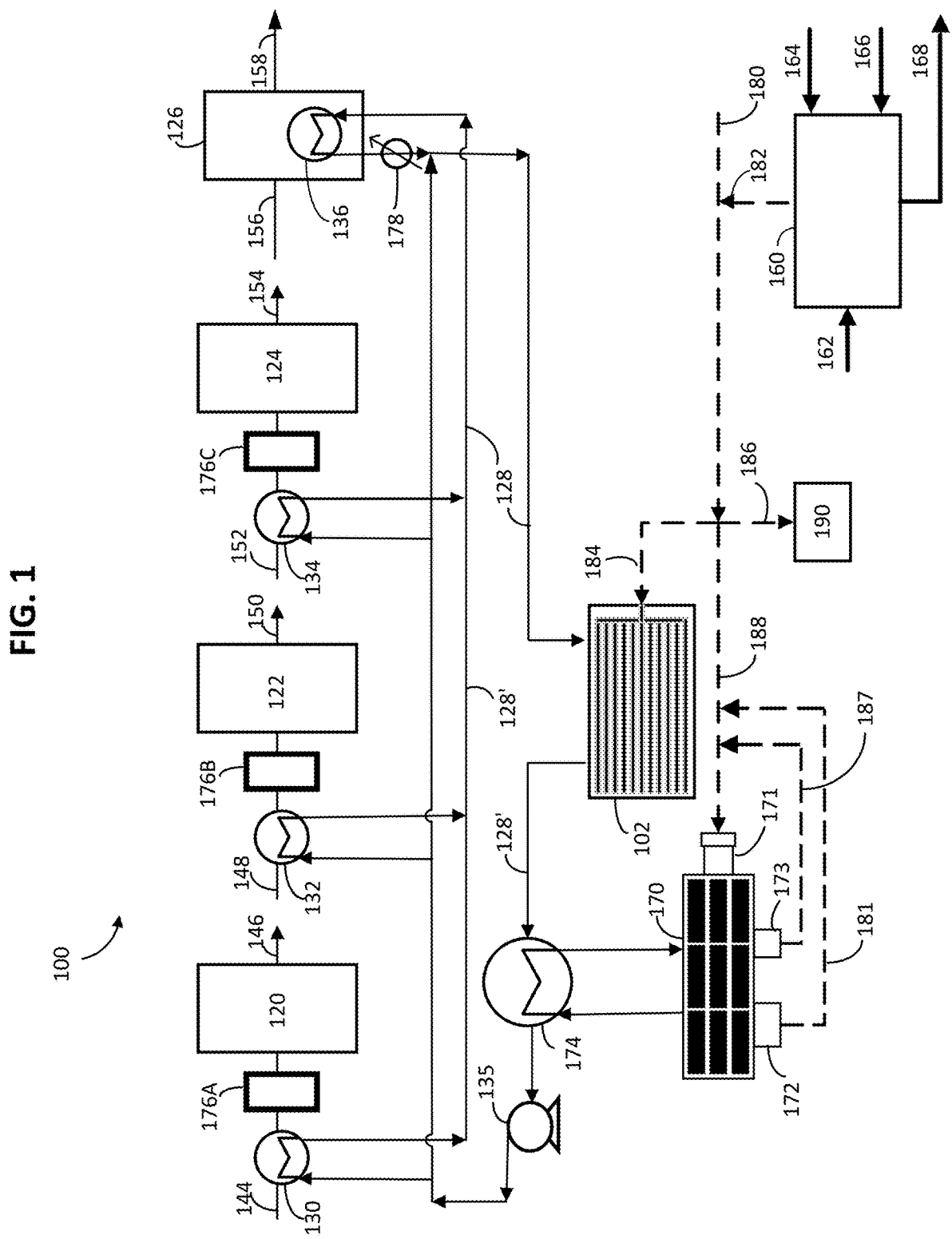
FIG. 1 shows an illustration of a petroleum processing facility modified to operate as a carbon neutral (CN) hydrocarbon processing facility using internally stored thermal energy in part to process petroleum materials.

As used herein, "eco-refinery" and "eRefinery" refer to a carbon-neutral hydrocarbon processing facility or refinery operating as a system and the associated apparatus, methods, and processes for the processing of fossil fuels and hydrocarbons under conditions of overall carbon-neutrality with respect to the environment.

As used herein, "carbon-neutral hydrocarbon processing facility" refers to new facilities and conventional refineries that have been wholly or partially converted to operate under overall carbon-neutral ("CN") conditions by means of replacing carbon emitting processes with improved methods that employ carbon-neutral liquid organic hydrogen carriers (LOHC) as an alternative fuel system and which utilize these materials to generate heat and electricity to operate the facility, store excess thermal and electrical energy, export electrical energy to the electric grid, and to generate and recycle tailored LOHC materials for use as fuels to operate transportation systems and stationary utilities under carbon-neutral conditions to replace conventional hydrocarbon use.

As used herein, "liquid organic hydrogen carrier" or "LOHC" refers to a hydrogenated organic substrate selected from monocyclic, polycyclic, heterocyclic, and homocyclic organic compounds that can be processed to release chemically bound hydrogen via dehydrogenation and are liquid at standard temperature and pressure (STP, 0° C., 1 bar).

As used herein, the term "R-LOHC" refers to a regenerated or hydrogen-enriched, fully, or at least partially hydrogenated form of the liquid organic hydrogen carrier. The R-LOHC may be, in sequential process steps, dehydrogenated to remove at least a portion of the hydrogen atoms contained in the carrier to form S-LOHC, that may be rehydrogenated to replace at least a portion of the removed hydrogen atoms.

As used herein, the term "S-LOHC" refers to a spent or hydrogen-deficient, at least partially dehydrogenated form of the liquid organic hydrogen carrier.

As used herein, the term "recycle" or "recyclable" used in conjunction with LOHC refers to LOHC material (see S-LOHC) that, when at least partially used or spent, is capable of being converted to enriched or regenerated LOHC (see R-LOHC) for further use or storage.

As used herein, the term "labile hydrogen" refers to the portion of chemically bound hydrogen in a hydrogenated LOHC that may be reversibly removed by dehydrogenation, and subsequently reversibly replaced by a following hydrogenation reaction.

As used herein, the term "recyclable LOHC" refers to an LOHC having the capability of being reversibly hydrogenated to form "R-LOHC", and then reversibly dehydrogenated to form "S-LOHC", in a multiply cyclic process.

As used herein, the related terms "carbon-neutral component" and "CN component" refers to liquid compounds containing carbon-neutral carbon that may be added to the LOHC feed at various stages in the disclosed methods and processes in sufficient amounts to at least equal the quantity of carbon atoms being exhausted during a disclosed process. The exhausted carbon atoms may include vented hydrocarbons and/or vented carbon oxides, including the most common form being carbon dioxide. The carbon in these "CN components" is termed as "carbon-neutral carbon" by reason of its origin from carbon compounds that are captured from the atmosphere or from flue gas that is being vented to the atmosphere, including carbon dioxide ($CO2$).

Unless otherwise indicated, the acronym "carbon-neutral hydrocarbon processing facility" and "carbon-neutral refinery" refers to facilities that process fossil fuels and related hydrocarbon compounds and are operated under conditions that enable carbon-neutral processing of these materials with respect to the overall environmental carbon footprint of the facility and its component process units.

Unless otherwise indicated, the acronym "MCH" is intended to refer to methylcyclohexane.

Unless otherwise indicated, the acronym "BTX" is intended to refer to a mixture of benzene, toluene, and xylene, in any ratio.

Unless otherwise indicated, the acronym "GHG" is intended to refer to a greenhouse gas found in the earth's atmosphere that may absorb and emit radiant energy within the thermal infrared range.

Unless otherwise indicated, the term "CN" is intended to refer to "carbon-neutral" compositions, processes and apparatus employing these compositions. The process of generating hydrogen from a blended LOHC feed and of generating electricity from the generated hydrogen is termed as "carbon-neutral" by reason of the purposeful addition of the CN component containing carbon-neutral carbon to the LOHC feed in sufficient amount to at least equal the number of carbon atoms being exhausted during the electrical generation process, including vented hydrocarbons and vented carbon oxides.

Unless otherwise indicated, the term "carbon-neutral carbon" or "CNC" further includes carbon compounds that are produced by photosynthesis or are captured from the atmosphere, including carbon oxides, and from combustion processes and from flue gas emissions that would otherwise persist or be released into the atmosphere.

Unless otherwise indicated, the term "green" in association with energy, electricity, heat, hydrogen and other materials is intended to refer to the source of that material being derived, manufactured or obtained in an environmentally friendly manner that did not result in the net release of carbon dioxide to the atmosphere, thus being carbon-neutral with respect to their source, and being carbon-neutral carbon compounds if containing carbon, and either not requiring the production of carbon dioxide in their manufacture, or if so required, not releasing a significant amount of carbon dioxide to the environment during their collection, distribution, isolation, manufacturing, storage, transportation, use, and combinations thereof.

Unless otherwise indicated, the term "green electricity" is intended to refer to sources of electricity that include geothermal, hydrothermal, hydroelectric, solar, wind, nuclear fusion, nuclear fission, wave action, and combinations thereof.

Unless otherwise indicated, the term "HTF" is intended to refer to "heat transfer fluids" being materials that are flowable and pumpable liquids under operating conditions and which remain chemically stable at the process temperatures employed by the various components of the facilities as disclosed, and which act as heat and thermal energy transfer materials in association with a "HTF heat exchanger," which unless otherwise indicated is a device that facilies the exchange of heat and thermal energy between an HTF and a second device or process module, between two identical liquid HTFs, and between two different liquid HTFs, and combinations thereof, operating to transfer thermal energy between them as desired.

As used herein, the term "cogeneration" or "cogen" in association with an apparatus, step, process, process unit, and combinations thereof, refers to the capability of generating various combinations of energy and materials including, but not limited to, electricity, heat, hydrogen, LOHC materials, oxygen, thermal energy, and water, as needed for any particular disclosed process, including the reverse processes of employing combinations of the disclosed energy sources and materials interchangeably to generate any desired subset of the materials, to use these materials to generate electricity, heat and thermal energy, and to interconvert LOHC materials between their depleted S-LOHC forms and their labile hydrogen enriched R-LOHC forms as needed.

DETAILED DESCRIPTION

One general embodiment of the present disclosure relates to a method of operating a hydrocarbon processing facility involving the steps of: (a) obtaining a source of import electricity from an electrical utility grid; (b) converting the import electricity to heat by means of ohmic conversion; (c) storing the heat as thermal energy within a heat storage means; wherein the heat storage means is selected from a heat source, heat transfer fluid (HTF), thermal battery, and combinations thereof; and (d) using the thermal energy as a heat source to power the operation of a plurality of hydrocarbon processing units; wherein the thermal energy is distributed between the heat storage means and the hydrocarbon processing units by means of a heat transfer fluid (HTF), and wherein the steps may be performed in any order as necessary.

A further embodiment relates to the source of import electricity being electricity derived from a renewable resource selected from geothermal, hydrothermal, hydroelectric, solar, wind, nuclear fusion, nuclear fission, wave action, and combinations thereof, including embodiments wherein green energy is electricity is obtained from an environmentally friendly, carbon neutral process that does not release carbon dioxide to the environment.

In another embodiment, the operation of the hydrocarbon processing unit is carbon neutral in its manner, using thermal energy that is generated internally at least in part by at least one of the processing units by means of heat released during the catalytic hydrogenation of an unloaded liquid organic hydrogen carrier (S-LOHC), wherein the catalytic hydrogenation is conducted by means of an exothermic reaction conducted within a catalytic hydrogenation unit that combines hydrogen with the unloaded LOHC to produce a labile hydrogen loaded liquid organic hydrogen carrier (R-LOHC).

In a related embodiment, the thermal energy is generated internally at least in part by means of heat released during the electrochemical oxidation of hydrogen conducted within an electrochemical fuel cell, wherein the source of the hydrogen includes hydrogen gas recovered from the catalytic dehydrogenation of a loaded liquid organic hydrogen carrier (R-LOHC) obtained by means of a dehydrogenation reaction conducted within a fuel cell, or alternatively wherein the source of the hydrogen is hydrogen gas recovered from the electrolysis of water obtained by means of an electrolysis reaction conducted within a catalytic electrolysis cell using a source of green electricity.

In further embodiments, the hydrocarbon processing facility uses at least a portion of otherwise wasted heat being a source of thermal energy that is heat captured by means of heat transfer to a liquid HTF by means of a heat exchanger in thermal communication with a heated liquid or gaseous effluent emanating from a fuel cell, hydrolysis cell, cooling tower, steam vent, catalytic hydrogenation cell, catalytic electrolysis cell, furnace, waste heat stream, heated exhaust stream, and combinations thereof, to improve the overall carbon neutral efficacy of the facility as disclosed herein.

In the disclosed embodiments, the heat transfer fluid (HTF) is a material that is chemically stable, liquid and flowable over the operating temperature ranges of any one of the processing units.

In yet further embodiments, the source of import electricity is used when an excess is available or green electricity from the grid is readily available, and used in part to convert an unloaded liquid organic hydrogen carrier (S-LOHC) into a labile hydrogen loaded liquid organic hydrogen carrier (R-LOHC) as a means of storing the import electricity in the form of a liquid chemical battery while simultaneously generating thermal energy in the form of heat that is stored in the heat storage means by means of the heat transfer fluid, thus storing available green energy for later use within the hydrocarbon processing facility as disclosed.

In another general embodiment, the labile hydrogen loaded liquid organic hydrogen carrier (R-LOHC) is dehydrogenated within a catalytic dehydrogenation unit using the stored thermal energy to provide a source of hydrogen gas that is catalytically oxidized within a fuel cell unit to produce an unloaded liquid organic hydrogen carrier (S-LOHC) and water while simultaneously generating a source of green electricity that may be returned to the electrical utility grid, particularly at times of deficit electricity availability from the utility grid.

To convert electricity to heat, some embodiments of the disclosure employ a means of ohmic heating that is selected from dielectric heating, Joule heating, resistive heating, resistant heating, inductive heating, radiative heating, microwave heating, electromagnetic heating, thermoelectric heating, and combinations thereof, all of which generate heat in the form of thermal energy that raises the temperature within a thermal battery for storage and later use within the hydrocarbon processing facility as disclosed herein.

Accordingly, in another general embodiment, the stored thermal energy is communicated to the plurality of processing units by means of: (a) heating the liquid HTF by means of a thermal battery to produce heated HTF; wherein the heating is done by means of a stored heat exchanger associated with the thermal battery; (b) conducting the heated HTF to the plurality of processing units by means of a plurality of heat transfer loops associated with the stored heat exchanger; (c) transferring the thermal energy between the liquid HTF and the processing units to release by means of a plurality of heat exchangers associated with the pro-cessing units; (d) returning a cooler liquid HTF to the thermal battery by means of a second plurality of heat transfer loops; wherein the cooler liquid HTF is reheated to a higher temperature using the thermal energy stored within the thermal battery by means of the stored heat exchanger, wherein the steps may be performed in any order as well as simultaneously as needed.

In further embodiments, byproducts of the operation of any of the processing units as disclosed are captured, retained, released, or used internally in the operation of the hydrocarbon processing facility; wherein the byproducts are selected from carbon oxides including carbon dioxide, hydrogen, hydrocarbons, oxygen, petroleum compounds, water, and combinations thereof.

Related embodiments contemplated a new facility using the disclosed apparatus, methods, operations and steps as well as an existing conventional petroleum processing facility that has been retrofitted to operate as a carbon neutral facility by means of replacing hydrocarbon burning equipment selected from furnaces, heat generators, internal combustion engines, electric power generators, steam generators, and any process equipment that releases carbon oxides to the environment during their operation with a carbon neutral energy source providing the equivalent supply of electricity and thermal energy by means of a carbon neutral process providing the supply of electricity and thermal energy derived from a source of green energy.

In the carbon neutral operation, additional embodiments of the disclosure relate to the use of a supply of thermal energy being provided to any one of the hydrocarbon processing units by means of a heated heat transfer fluid (HTF) that is maintained in thermal communication with the hydrocarbon processing units and a thermal battery by means of a plurality of heat exchangers associated with a plurality of HTF transfer loops bearing the heat transfer fluid, optionally with the aid of a plurality of pumps; wherein the heat transfer fluid (HTF) is a material that is chemically stable, liquid and flowable over the operating temperature ranges of any one of the processing units.

In a general embodiment of the disclosure, all steps conducted in the operation of the hydrocarbon processing facility are carbon neutral operations that are deemed to be in compliance with the requirements of all Scope 1 provisions of the 2016 Paris Agreement.

In a further general embodiment of the disclosure, all materials and services used in steps conducted in the operation of the hydrocarbon processing facility are carbon neutral and are deemed to be in compliance with the requirements of all Scope 2 provisions of the 2016 Paris Agreement.

In yet further general embodiment of the disclosure, resulting products of any one of the plurality of processing units produced in the operation of the hydrocarbon processing facility are carbon neutral carbon products that are deemed to be in compliance with the requirements of all Scope 3 provisions of the 2016 Paris Agreement.

Specific embodiments of the present disclosure follow with the aid of figures to better illustrate the apparatus, methods and processes enabled by the eco-refinery (eRefinery) system and its component modules as contemplated herein.

FIG. 1 shows a schematic illustration of a carbon neutral (CN) hydrocarbon processing facility 100, where the solid lines and arrows represent the flow and direction of flow, respectively, of materials including hydrocarbon and petroleum feedstock materials, and heat transfer fluid (HFT), and wherein the dashed lines represent the flow and direction of flow, respectively, of electricity and electrical energy.

FIG. 1 shows a schematic illustration of an embodiment of a CN hydrocarbon processing facility 100 ("eRefinery") that may be operated under conditions of internal thermal balance, requiring no combustion of hydrocarbons materials, and thus producing no gaseous carbon dioxide ($CO_2$) emissions. In an alternative embodiment, the facility 100 may be operated under conditions requiring some combustion of hydrocarbons, but operates in a manner that results in substantially reduced gaseous carbon dioxide emissions that may be offset by the use of carbon-neutral materials for an overall carbon-neutral operational footprint with respect to the environment.

In related embodiments, the CN hydrocarbon processing facility 100 hosts a plurality of processing units (120, 122, 124, 126). Heat for operating each process unit, which would otherwise be conventionally supplied by a process furnace fired by a hydrocarbon fuel, is operating at least in part using internal heat provided by a liquid heat transfer fluid (HTF) circulated by means of a HTF loop 128' providing heated HTF and HTF loop 128 returning cooled HTF to electrical heater 102.

When sufficient renewable electricity is available from the grid in the form of import electrical energy 180, the circulating HTF may be heated by the electrical heater 102. Renewable electricity available for providing heat and internal electricity for the CN hydrocarbon processing facility 100 may be supplied from an external source 180 and from an onsite cogeneration unit 160 in the form of internally generated electrical energy from cogeneration unit 182.

In alternative embodiments, when external available renewable electricity is insufficient to operate the refinery, the circulating HTF may be further heated by a stored heat exchanger 174 with heat in the form of thermal energy stored within a heat storage means 170, such as a thermal battery. The circulating HTF may be further heated under some embodiments using waste heat present in the cogeneration exhaust stream 168 recovered from operation of the cogeneration unit 160. In related embodiments, waste heat generated by any of the process units may be fully or at least partially captured for transfer and storage within the heat storage means 170, rather than released to the environment.

As illustrated in FIG. 1, thermal energy stored in the heat storage means 170, which includes a thermal battery, may be recovered for internal use (thermal recovery) by using the stored heat exchanger 174 to extract heat by means of heating cooler liquid HTF as disclosed herein in multiple embodiments. In related embodiments, the thermal energy can be redirected to produce electricity as well, as for example, but not limited employing the stored heat exchanger 174 to transfer heat to heat and boil water to produce steam, which is then employed by a steam generator or steam turbine to generate electricity using a traditional electrical generator that only requires rotational energy to generate electricity.

In some embodiments, the heat storage means 170 may be a carbon block or other material that may be heated to extremely high temperatures without chemical or physical degradation while storing the heat internally. Additional heat storage means are disclosed hereinbelow.

In some embodiments for example, but not limited to carbon heated thermal batteries, the heat storage materials will follow the laws of black body radiation as well known in the art and will glow white hot at temperatures around 1,500° C. and above, glow in the far infrared at temperatures around 1,000° C., and glow in the near infrared at temperatures around 500° C. and below. In some embodiments, this emitted electromagnetic energy (i.e. photonic radiation) may either be absorbed by the insulated walls of the enclosure or reflected back into the thermal mass using a mirror as a surrounding film, container or means to redirect the radiation to prevent energy loss. However, in related embodiments, this electromagnetic energy may be harvested and converted directly to useable electricity by means of a photonic converter 172 that operates is a similar fashion to conventional solar cells but has improved efficiency and stability of operation at high temperatures and high photonic radiation flux levels. Photonic converters 172 suitable for use include for example, but are not limited to crystalline-silicon cells stable at high temperatures and efficient under near white light emission spectrums and are capable of efficient and direct conversion of high energy photons to photonic electrical energy 181. Photonic converters further include for example, but are not limited to perovskite-type solar cells and tandem photovoltaics that operate under lower radiation fluxes and temperature below around 1500° C. and below and which are also capable of efficient and direct conversion of energetic photons to useable electricity.

In other related embodiments, a thermopile 173 device may be employed that enables the direct conversion of heat to thermoelectrical energy. These are well known in the art, being an electronic device that converts thermal energy into electrical energy and which is generally composed of several thermocouples connected usually in series or, less commonly, in parallel, working on the principle of the thermoelectric effect which results in the generation of a voltage when its dissimilar metals (thermocouples) are exposed to a temperature difference. Thermopiles generally have low efficiency, but are consistent in their operation and can work at temperatures below about 700° C., or alternatively below about 400° C.

In these alternative embodiments employing a photonic converter 172 and a thermopile 173 to generate photonic electrical energy 181 and thermoelectric energy 187, respectively, the amount of electricity produced may not be sufficient for export to the electrical grid, but would be more than adequate to supply internal electricity needed by operation of the CN hydrocarbon processing unit and its plurality of process units as well as analytical, control, computer monitoring, measurement and safety equipment requiring electricity. As the efficiency and size of the thermal batteries improve and increase, these alternative sources of thermal-energy derived electricity are contemplated to become more efficient and practical for use as means of export electricity to a utility grid as alternative embodiments for use herein.

Relatively cooler liquid HTF that is returned via circulation loop 128 from the various process units may be heated in electrical heater 102 and circulated via HTF circulation loop 128' to the various heat exchangers (130, 132, 134, 136) associated with the one or more respective processing units that operate at elevated temperatures. Providing electrical heating as the source of process heat communicated via the circulation loop, optionally with the assistance of one or more pumps like pump 135, by means of a primary HTF electrical heater 102 serves to transfer internally generated heat for use in the process units, which prevents waste or loss of useful thermal energy to the environment, thus reducing the carbon footprint of the processing units during their operation, and enabling them to function on thermal energy generated internally without the need to combust hydrocarbons as a fuel for heating.

As illustrated in FIG. 1 and following figures to be presented hereinbelow, the in-line arrows represent the indicated direction of flow of a material, heat or electricity along the disclosed path, conduit, wire or connector between the indicated elements, modules, units, and devices.

In various related embodiments according to the present disclosure, the plurality of processing units 120, 122, 124 and 126 may be individually selected from process units conventionally operated in a petroleum refinery. The heat provided by exchange with the heated HTF may be used for one or more of preconditioning steps, for example including but not limited to heating a reactor unit, heating a reaction feedstock, conducting a reaction at an elevated temperature, and separating reaction products, and combinations thereof. Heat obtained by heat exchange with the heated HTF may also be employed for generating superheated water or process steam for use in a process as disclosed herein.

In various related embodiments according to the present disclosure, the plurality of processing units may include a first process unit 120, as a non-limiting example being an otherwise conventional crude distillation unit for fractionating crude oil feedstock as a first process unit feedstock 144 and recovering hydrocarbon fractions as a first process unit products 146 distinguished from each other by their boiling point ranges. Heat used in heating the first process unit feedstock 144 to the required distillation temperatures is provided through the first heat exchanger 130 using the heated circulating HTF rather than from conventional sources such as gas or oil-fired boilers or furnaces associated with that process unit.

In similar related embodiments, a second heat exchanger 132 can be employed within the circulation loops 128, 128' that is powered by heat from the circulating liquid HTF which provides thermal energy to a second process unit 122, being for example, but not limited to a hydrocarbon processing unit employed for upgrading a second process unit feedstock 148 such as distillate petroleum and residuum petroleum materials by cracking them into more desirable products shown as second process unit products 150. The cracking processes require high levels of heat to enable efficient sulfur and nitrogen removal, and thermal energy to power hydrogenation and dehydrogenation catalysts, and to reforming the hydrocarbons or enable alkylation, and the like. The circulating liquid HTF may provide heat for several operational steps in each of the disclosed processing units. In additional embodiments, feedstock 148 supplied to the second process unit 122 may be preheated by heat exchange with heated circulating HTF within the processing unit itself (not shown). In various related embodiments, the processing unit feedstock may be conditioned by distillation by heat exchange with heated circulating HTF within the processing unit, and alternatively the reaction zone in which the petroleum reaction and upgrading occurs may be heated by heat exchange with heated circulating HTF.

In alternative embodiments, subsequent process and sub-process steps that require cooling, for example but not limited to returning reaction products to ambient temperatures for storage, for further processing and for removing heat generated by an exothermic reaction processes, and the like may be achieved by additional heat exchangers (not shown) that couple with relatively cooled circulating HTF present in the HTF circulation loop 128 to recover this heat as useful thermal energy. In alternative embodiments, the heat exchange and recapture may also be aided by use of the addition of a cooled fluid such as water or a cooled petroleum stream, or by air heat exchangers that then transfer recovered heat to the heat storage means 170 directly, or do so by coupling with the HTF circulation loop 128.

Similarly, in yet further related embodiments, the liquid HTF circulation loops 128, 128' may deliver thermal energy through a third heat exchanger 134 for maintaining a petroleum reaction, such as a highly endothermic reaction (i.e. one requiring lots of heat input to proceed) conducted in a third process unit 124. An exemplary highly endothermic reaction is a dehydrogenation reaction for removing labile hydrogen from an LOHC material. Accordingly, in one exemplary embodiment, a dehydrogenation reaction dehydrogenates an R-LOHC type material used as a third process unit feedstock 152, the corresponding third process unit product 154 from the dehydrogenation process being hydrogen and a S-LOHC type material.

In yet further related embodiments, a fourth heat exchanger 136 may be employed within the circulation loops 128, 128' for exchanging thermal energy with a fourth process unit 126, being for example, but not limited to, a hydrogenation unit for hydrogenating an S-LOHC feedstock as a fourth process feedstock 156. The hydrogenation reaction is an example of an exothermic reaction that generates heat useful as thermal energy for storage or direct addition of heat to the circulating HTF. In related embodiments, the S-LOHC feedstock comprises, at least in part, a carbon neutral component derived from biological and renewable sources. In these embodiments, the fourth process unit products 158 would include an R-LOHC product recovered from hydrogenation that may be used as a source of hydrogen for the generation of electricity for use within the CN hydrocarbon processing facility 100, as a hydrogen feedstock for hydrogen-based reactions within the facility 100, or for export for external use.

Similarly, in yet further related embodiments, the fourth processing unit 126 may be used to conduct other exothermic reactions, such as for example, but not limited to a fluid catalytic cracking (FCC) unit. FCC operation includes contacting a heavy gasoil feedstock with hot circulating catalyst for cracking the feedstock to lower boiling products. Cracking the FCC feedstock by contact with the hot catalyst causes a substantial amount of carbon to deposit on the catalyst. Regenerating the carbon-fouled catalyst involves burning the catalyst in a regenerating unit that is a component of the FCC system. Catalyst regeneration in the FCC generates large quantities of carbon dioxide that may be recovered from the regenerator flue gas for sequestration to contribute to the carbon neutral operation of the CN hydrocarbon processing facility 100. Additionally, heat in the flue gas may be recovered by the fourth heat exchanger 136 or an additional heat exchanger located within the flue venting system (not shown). In this way, heat and thermal energy flows are balanced through the entire facility, with zero or at least minimal heat loss and with zero or at least minimal carbon dioxide emission to the environment.

In further embodiments, electrical energy is a source of heat to the plurality of process units via the medium of the circulating heated liquid HTF. Both internally generated electrical energy 182 and externally sourced renewable import electrical energy 180 may be used to generate thermal energy as a heat source. The electrical energy may be input as electricity 184 to an electrical heating unit 102 for heating the liquid HTF to a desired temperature. In other embodiments a portion of the electrical energy may be generated by means of operating a fuel cell unit (see also FIG. 5).

In other embodiment according to the present disclosure when excess import electrical energy 180 is available, at least a portion of that electrical energy as electricity 186 may be stored in a conventional electric battery 190, or alternatively the electrical energy 188 may be stored as heat in a thermal battery 170 by means of an resistance heater or ohmic heater 171 that converts electricity to heat, allowing green electrical energy available at one time to be temporarily stored and then released at another time when needed for use in an internal process.

It is noted that conventional electric batteries are currently large and potentially cost prohibitive for use as a sole electrical energy source, but nevertheless may serve to store sufficient amounts of operational electrical potential and electricity to maintain at least partially some functions needed to control, monitor and run electrical equipment associated with the CN hydrocarbon facility 100, such as computers, controllers, measurement equipment, monitors, pumps, valves, and combinations thereof, particularly for safety and safe shutdown procedures in the event of a catastrophic or sudden loss of electricity from the external grid, or during interim times when other energy sources such as stored chemical and thermal energy are being brought online to provide energy for internal processes. Further developments in electric battery storage systems may enable an electric battery system such as electric battery 190 to retain larger amounts of electrical energy sufficient to supply other operational needs as disclosed herein, and potentially as a means of storing excess electrical potential or electricity for internal use as well as export to the grid. In related embodiments, the electric battery 190 may include a capacitor, supercapacitor and the like, and serve also as an emergency power generator to supply electricity to the CN hydrocarbon facility while conventional backup generators, which typically suffer from a slight delay or hysteresis lag come online to provide backup electrical power.

Thermal batteries operate on basic principles involving the atomic level of matter, with energy being added to or taken from either a solid mass or a liquid volume which causes the substance's phase or temperature to change. Some thermal batteries also involve causing a substance to transition thermally through a phase transition which causes even more energy to be stored and released due to the delta enthalpy of fusion or delta enthalpy of vaporization. Suitable heat reservoirs include, but are not limited to a phase change thermal battery, for example using molten metals and salts; an encapsulated thermal battery, for example using carbon blocks, water, oil, or sand; unencapsulated thermal batteries, for example using a ground heat exchanger to take advantage of the insulating properties of local earth to store heat in bedrock, soil or in a pumpable fluid in a borehole such as in deep aquifers contained between impermeable strata; and conventional steam accumulators that use superheated water and pressurized steam to temporarily store thermal energy. These and other means available in the art to store electrical and thermal energy are all suitable for use with the disclosed embodiments herein. In related embodiments, the thermal battery is configured to store heat at temperatures of 500° C. and higher, and in some cases of 600° C. and higher.

In further embodiments, a combustion process may be provided for burning light petroleum gases 162 and excess or waste hydrogen 164 derived from a refining process, as well as small amounts of waste S-LOHC 166 that would otherwise be vented, and the heat extracted and recovered for use within the CN hydrocarbon processing facility 100. In a further related embodiment, a combustion process to generate heat may take place in a furnace, in a small gas turbine, or in a cogeneration unit 160 that is operated to produce internally generated electricity 182 by combustion to provide an amount of electricity for use in the facility 100, and an amount of waste heat recovered from the combustion process then being immediately used or stored for later use as thermal energy. Exhaust gases from the cogeneration exhaust stream 168 resulting from combustion may be captured by a carbon capture, carbon sequestration, or related process to prevent or reduce the liberation of carbon dioxide to the atmosphere.

In further embodiments, one or more supplemental combustion heaters 176 fired by natural gas fuels may be associated with one or more of the internal process units, for example 176A with first process unit 120, 176B with second process unit 122, 176C with third process unit 124, and so on. The supplemental combustion heaters 176 are available during startup, during operation transients, or when the temperature of the heated circulating HTF falls below a threshold value needed for that particular process and process unit. Gaseous emissions from these supplemental combustion heaters may also be captured and sequestered as disclosed herein, and also vented heat captured for internal storage, to produce heated water and steam, and combinations thereof to improve the overall thermal efficiency of the CN hydrocarbon processing facility 100 as disclosed herein.

In further embodiments, including, for example, when the CN hydrocarbon processing facility 100 is retrofitted from a convention petroleum refinery, the process units which include combustion furnaces may retain the furnaces after the retrofit and operate them, under normal operating conditions, with gas fired pilot lights only being maintained. As shown in FIG. 1, process units 120, 122 and 124 include supplemental combustion heaters 176A, 176B, and 176C that are downstream of the respective heat exchangers 130, 132, and 134. Under conditions wherein the heated HTF circulation system cannot provide sufficient heat for whatever reason, a furnace outlet temperature controller will operate to provide fuel gas to the respective furnace to maintain the required process temperature. When the heated HTF circulation system is restored to sufficient operational temperature, the temperature controller will gradually restrict the supply of the fuel gas to the respective furnace, which will then be turned down with only gas fired pilot lights being maintained. In these embodiments, gaseous carbon dioxide generated by combustion in the respective combustion furnaces may be captured and sequestered as well.

In one embodiment, the circulating HTF flow for delivering heat to the process units is reversed for the exothermic reaction illustrated by process unit 126. In this case, the relatively cooler HTF in circulation loop 128 is heat exchanged at the fourth heat exchanger 136 within process unit 126, so as to absorb some of the excess heat generated by the exothermic reactions conducted within. Additional cooling may be provided by the supplemental cooling exchanger 178. In further embodiments, the supplemental cooling exchanger 178 may be an air cooler or alternatively a steam boiler for generating utility steam while cooling the product stream coming from process unit 126, or other process units not specifically disclosed herein.

In related embodiments of the disclosure, heat and thermal energy produced within the HTF system may be captured and stored, or distributed by means of the HTF circulation loop 128 to both internal and external processing units that require heat for their operation, preventing the undesirable loss of heat and its thermal energy equivalent to the environment, and thus operating to reduce the carbon footprint of both a LOHC recycle unit associated with the fourth process unit 126 and the associated external processes that benefit from being converted to better utilize thermal energy in their operations.

Operating a complex refinery as illustrated in FIG. 1 requires the use of, for example, numerous pumps, control valves, analysis and monitoring systems, computers and the like. Locating, installing, and operating these components are well within the purview of a skilled practitioner, and, for purposes of clarity of the inventive features of FIG. 1, have not been included in the schematic.

Figure 2:
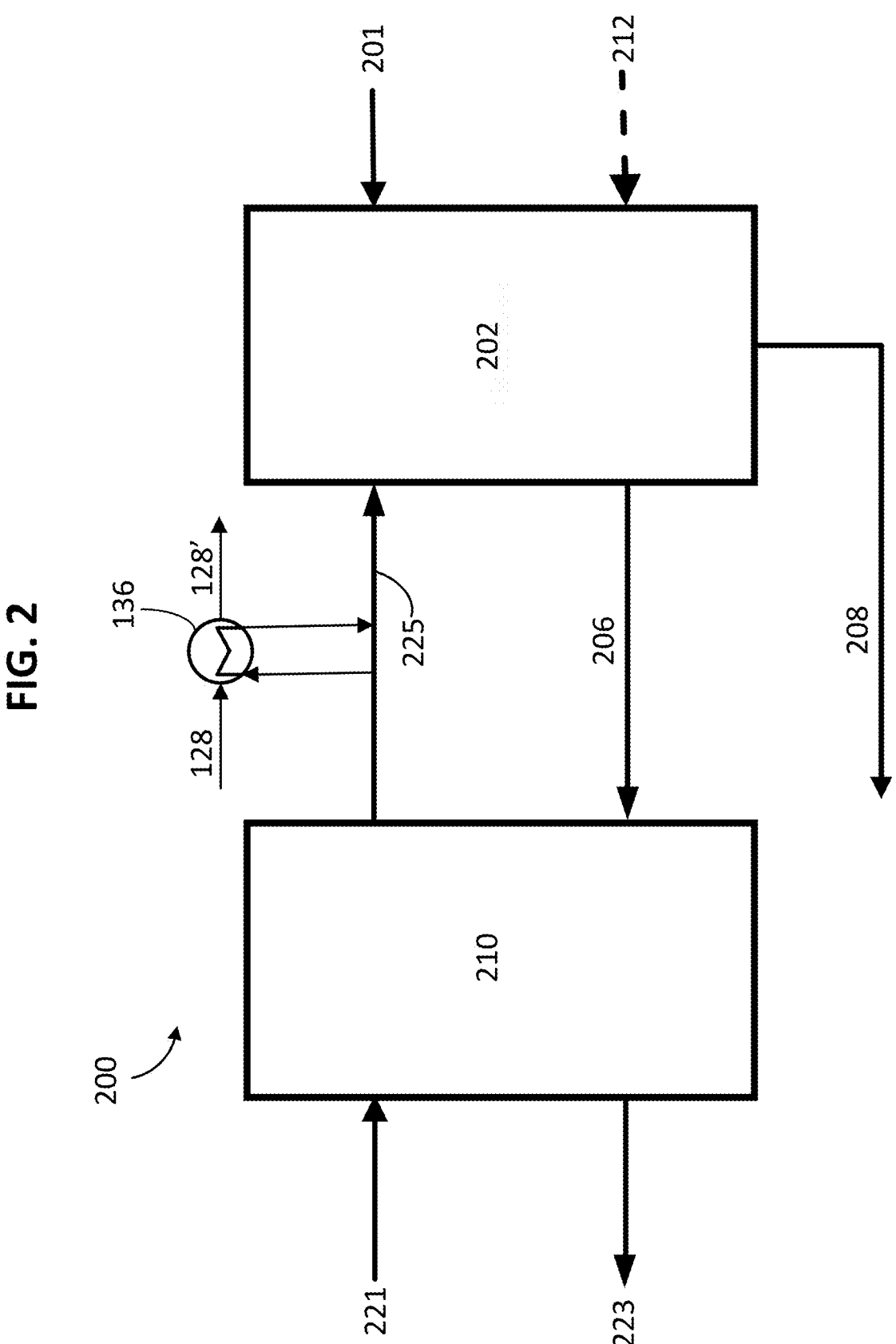
FIG. 2 shows an illustration of combined catalytic hydrogenation and electrolysis units employing a carbon neutral liquid organic hydrogen carrier (LOHC) material to store hydrogen as a labile source of energy convertible to chemical, electrical, heat, thermal energy, and combinations thereof.

FIG. 2 shows a schematic illustration of a combined catalytic hydrogenation and electrolysis module 200 wherein the solid lines and arrows represent the flow and direction, respectively, of materials, including LOHC materials, steam, hydrogen, water, and wherein the dashed lines and arrows represent the flow and direction, respectively, of electricity and electrical energy.

FIG. 2 shows a schematic illustration of one embodiment relating to a CN hydrocarbon processing facility featuring a combined catalytic hydrogenation and electrolysis module 200 operating with balanced heat flow and with reduced or zero carbon dioxide gaseous emissions from the process. In the embodiment illustrated in FIG. 2, gaseous hydrogen 208 for use in petroleum upgrading and hydrogenation is generated by electrolysis of water 201 in electrolysis unit 202 using renewable electricity 212 provided from an external source, including from the electrical grid, one or more internal sources, including a cogeneration unit 160 (shown in FIG. 1), or output from a fuel cell unit (shown in FIG. 5), and combinations thereof. Electrolysis of water, including water containing an electrolyte such as a salt, acid, base, and combinations thereof, or alternatively using an electrocatalyst, is well known in the art.

At least a portion of the hydrogen produced, internal hydrogen 206 obtained from electrolysis may be supplied to a catalytic hydrogenation unit 210 for chemical addition to an LOHC material, such as an S-LOHC 221, that is relatively depleted of hydrogen. Addition of hydrogen to the S-LOHC produces a hydrogen enriched LOHC, or R-LOHC 223, that may be passed to storage for use in the CN hydrocarbon processing facility 100 illustrated in FIG. 1. In other embodiments, the R-LOHC 223 may be exported for external use, or may be used internally to generate gaseous hydrogen, and combinations thereof. Operation of the catalytic hydrogenation unit 210 typically produces steam 225 that may be used as a source of water, superheated water, or steam in the electrolysis unit 202.

The catalytic hydrogenation process carried out by the catalytic hydrogenation unit 210 illustrated in FIG. 2 is a highly exothermic process, generating excess heat over that needed for feed preheating, for reaction maintenance and for conditioning of hydrogenated products. Accordingly, the excess heat generated in some embodiments may be captured, converted, or contained in the form of elevated temperature water and steam 225 that may be supplied to the electrolysis unit 202 to increase the electrolysis operating efficiency. Additional heat may be supplied by the fourth heat exchanger 136 to a circulating HTF with an HTF circulation loop 128, 128' that is maintained at elevated temperature by electrical heating and exchanged with stored heat from a heat storage means 170 (see FIG. 1).

Figure 3:
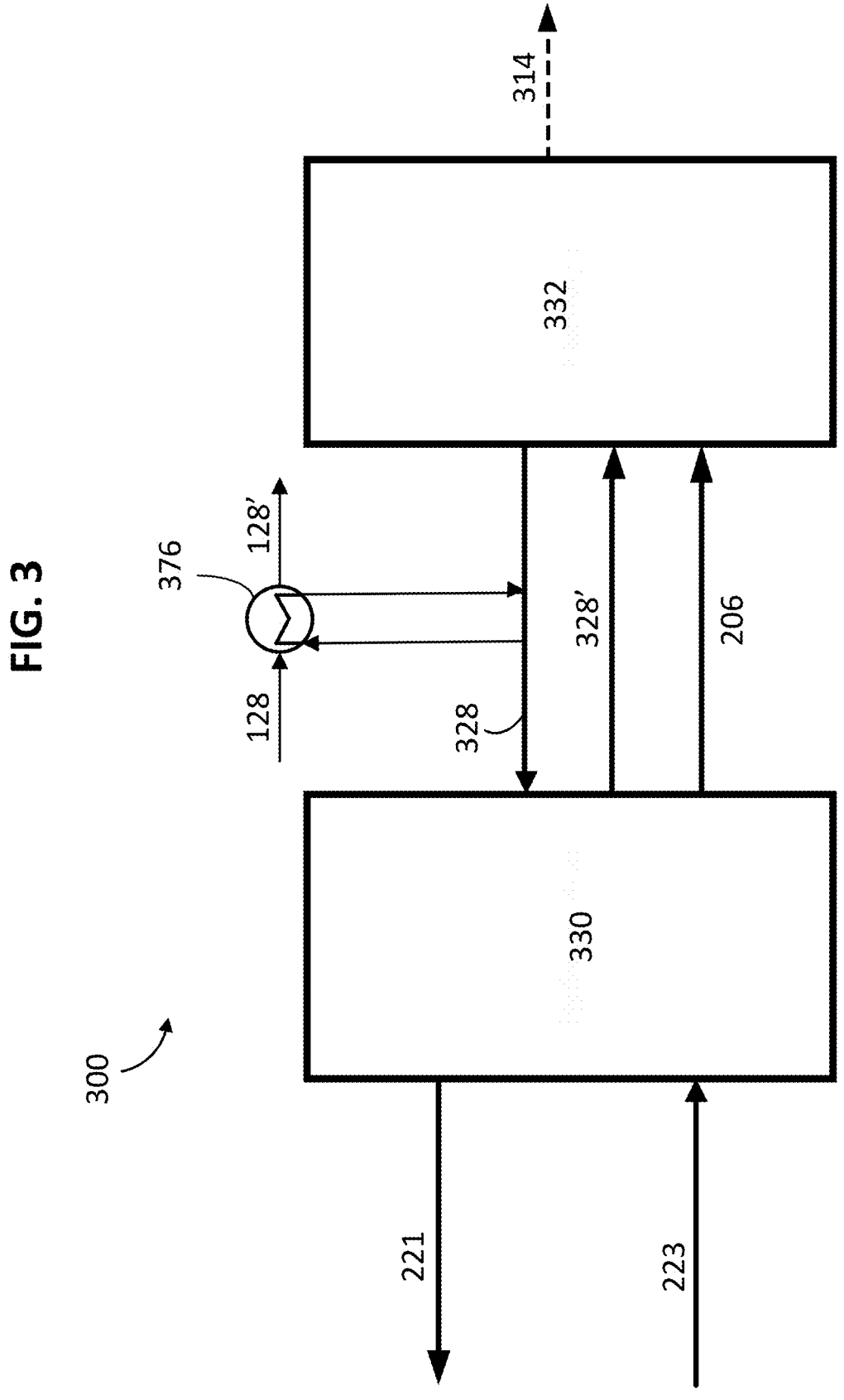
FIG. 3 shows an illustration of combined catalytic hydrogenation and fuel cell units employing a carbon neutral liquid organic hydrogen carrier (LOHC) material to liberate stored potential chemical energy in the form of electricity, heat, hydrogen, thermal energy, and combinations thereof.

FIG. 3 shows a schematic illustration of a combined catalytic dehydrogenation and fuel cell module 300 wherein the solid lines and arrows represent the flow and direction, respectively, of materials, including LOHC materials, steam, hydrogen, water, and wherein the dashed lines and arrows represent the flow and direction, respectively, of electricity and electrical energy.

FIG. 3 shows a schematic illustration of another embodiment of a module within a CN hydrocarbon processing facility as disclosed herein operating with balanced heat flow and with reduced or zero carbon dioxide gaseous emissions from the process by means of a combined catalytic dehydrogenation and fuel cell module 300. In the embodiment illustrated in FIG. 3, an LOHC that is relatively enriched in hydrogen, i.e. R-LOHC 223, is dehydrogenated in a catalytic dehydrogenation unit 330, and the recovered hydrogen, after optional conditioning (not shown) to produce internal hydrogen 206, is electrochemically converted in a fuel cell unit 332 to water, with the associated generation of electricity. The generated electricity 314 is available for storage internal to the processing facility, for use to generate heat, as an electric power source, and combinations thereof within the processing facility or alternatively, exported for use elsewhere, and combinations thereof. A hydrogen depleted S-LOHC 221 that is also produced during the dehydrogenation process with the catalytic dehydrogenation unit 330 may be supplied to storage within the processing facility, converted to additional R-LOHC product for recycle, or exported for use elsewhere, and combinations thereof. In related embodiments the water 201 (not shown) that is produced may be stored for later use, used for cooling, for use in a fuel cell, heated to provide superheated water and steam for processes as disclosed herein, and combinations thereof, thus reducing the need to use external water, a particular advantage during times of water scarcity and drought conditions to enable yet further environmentally neutral operational conditions.

The catalytic dehydrogenation process illustrated in FIG. 3 is an endothermic process, requiring the addition of heat for feed preheating, for reaction and for conditioning of the internal hydrogen 206 prior to electrochemical conversion. The fuel cell unit 332 that is suitable for the process illustrated in FIG. 3 is highly exothermic and operates at a temperature higher than that needed by the dehydrogenation reaction in the catalytic dehydrogenation unit 330. In related embodiments, the fuel cell unit 332 is configured and controlled to operate at a temperature of at least 50° C. higher than the dehydrogenation reaction temperature within 330 to aid in heat transfer efficiency.

Excess heat recovered from fuel cell operation in 332 may be supplied for maintaining the dehydrogenation reaction in

330 and associated internal processes within the CN hydrocarbon processing facility 100. Additional heat may optionally be supplied by means of the supplemental heat exchanger 376 operating within a circulating HTF loop 128 and 128' that is in thermal exchange with the internal HTF circulation loops 328 and 328' that operate to maintain both units 330 and 332 at their desired temperatures for maximum operational efficiency.

Figure 4:
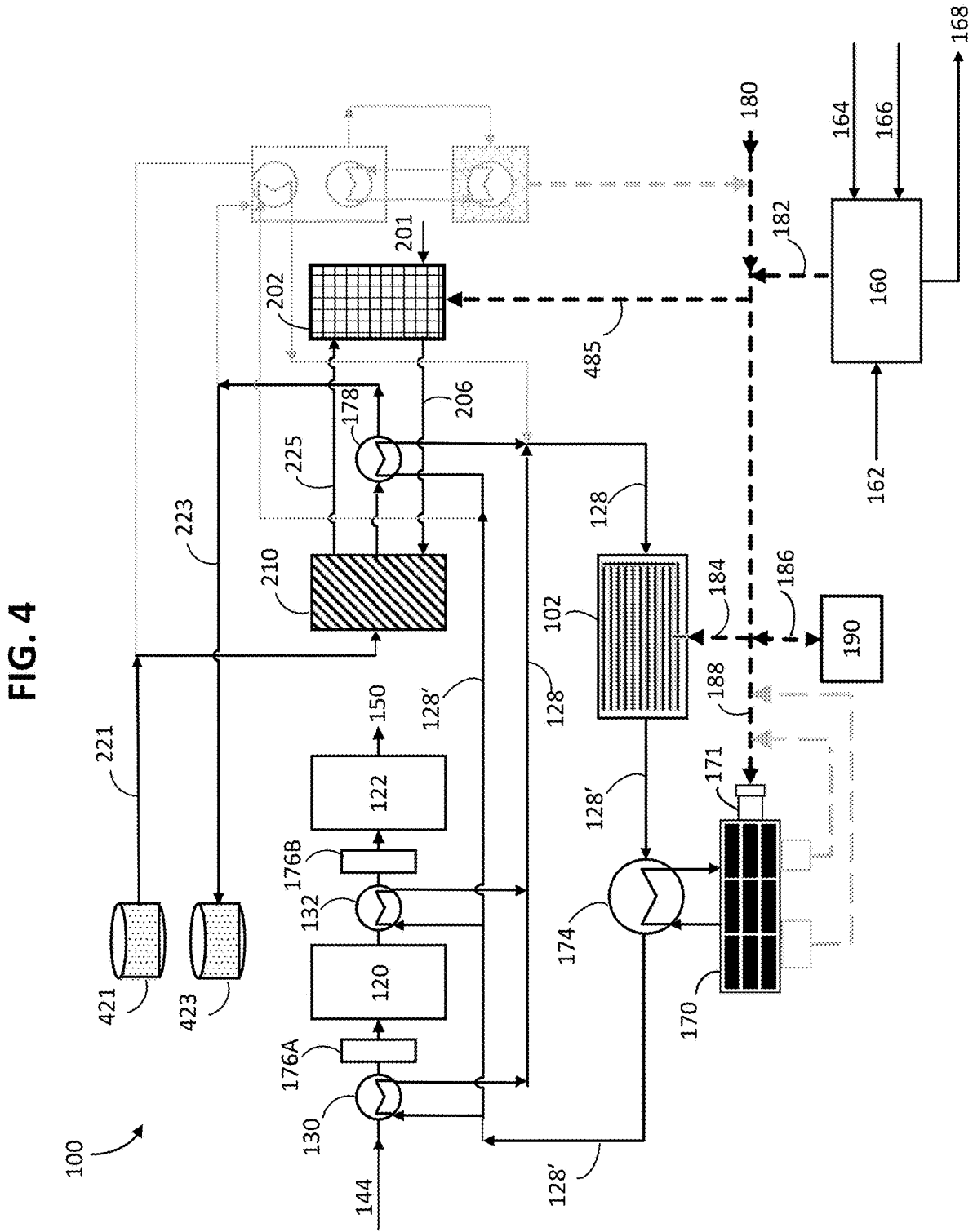
FIG. 4 shows an illustration of a CN hydrocarbon processing facility with internal apparatus, devices and processes being operated under the condition of excess or green external energy from the power grid being available.

FIG. 4 shows a schematic illustration of a CN hydrocarbon processing facility 100 during periods in which excess electricity is available from an external grid, with dashed lines and arrows illustrating the flow and relative direction of electricity, respectively, and solid lines and arrows indicating the flow of and relative direction of flow of materials, respectively, materials including liquid HTF, LOHC compounds, steam, water, hydrogen, hydrocarbon, and petroleum materials under operating conditions as disclosed in association with this figure. In contrast light gray lines and unit elements rendered in light gray shading indicate flows, processes and unit elements that are presently dormant under operating conditions as disclosed in association with this figure during the disclosed operations discussed hereinbelow.

FIG. 4 illustrates one embodiment of the present disclosure showing operation of a CN hydrocarbon processing facility 100 during periods in which excess electricity is available, such as when excess green electricity is available from the electric grid as import electrical energy 180, which may fully or partially be redirected as electricity for electrolysis 485 by use in the electrolysis unit 202 where water 201 is converted to internal hydrogen 206, for reaction with S-LOHC 221 obtained from S-LOHC storage tank 421 in the catalytic hydrogenation unit 210 to produce R-LOHC 223 which may be stored in an R-LOHC storage tank 423. Simultaneously, heat produced in the catalytic hydrogenation unit 210 may be redirected to the various conventional process units (e.g. 120, 122, etc.) as disclosed herein being fully or at least partially powered by heated HTF within the HTF circulation loops 128 and 128'. In related embodiments when additional thermal energy is needed the liquid HTF may be heated using thermal energy recovered from the heat storage means 170 or from the electrical heater 102 using electricity to the electrical heater 184 redirected from the supply of excess green electricity 180 or redirected battery electricity 186 from the electric battery 190, or combinations thereof. In a related embodiment when excess electricity is available, the electric battery 190 may be recharged to full capacity for later use of its stored electrical energy either supplied as electricity 184 to the electrical heater 102 to heat liquid HTF for circulation, or alternatively to the ohmic heater 171 to produce thermal energy for storage within the heat storage means 170, or yet alternatively to provide electricity for other operations within the CN hydrocarbon processing facility 100 as needed.

The catalytic hydrogenation unit 210 and the electrolysis unit 202 may be separate units, as shown in FIG. 4 or components of a combined hydrogenation and electrolysis module 200 (as shown in FIG. 2) that operates to achieve the same purpose of the separate units. In alternative embodiments, the fuel cell may be a regenerative fuel cell, being reversible in its operation as needed and having the capability of both generating an electric current in the presence of hydrogen, and of generating hydrogen in the presence of water and an electric current. When a Solid Oxide Fuel Cell (SOFC) is operated in regenerative (i.e., reversible) mode, the anode for the electricity production mode (fuel cell mode) becomes the cathode in the hydrogen generation mode (reverse fuel cell mode), and vice versa when operated in a normal fuel cell mode. When an external voltage is applied, water at the anode side will undergo electrolysis to form oxygen and protons, and the corresponding protons will be transported through the solid electrolyte to the cathode where they are reduced to form hydrogen. In this reverse mode, the polarity of the fuel cell is opposite to that polarity used for the fuel cell mode operation.

In yet alternative embodiments, light petroleum gases 162, waste hydrogen 164 and waste S-LOHC 166 may be combusted, optionally in a cogeneration unit 160, which generates electricity 182 for internal use or export, and generates a waste heat stream that can be captured and used internally (not shown) by means of a supplemental heat exchanger. The cogeneration unit 160 typically generates relatively small amounts of electricity and heat, and would not be considered a primary process for supplying electricity for the overall combined processes needed for operation of the CN hydrocarbon processing facility 100, but certainly may be used to provide supplemental internally generated electrical energy 182, and as a means to use waste materials efficiently to increase the overall CN footprint of the CN hydrocarbon processing facility 100.

It is noted in these presently disclosed embodiments that the ability of the processes internal to the CN hydrocarbon processing facility 100 to shift between different energy sources, including heat and electrical energy, with the ability to convert R-LOHC materials to useable thermal energy, hydrogen and electricity, enable the facility 100 to continue and maintain operations under overall carbon-neutral conditions under a variety of operating conditions both when connected to the electrical grid and when being operated independently of external sources of energy.

Further, the internal processes and apparatus of the CN hydrocarbon processing facility 100 can be adapted, combined, and modified to use all available forms of internal energy to produce export electricity to the grid during periods of external electrical deficit, while continuing to operate as a hydrocarbon processing facility.

Figure 5:
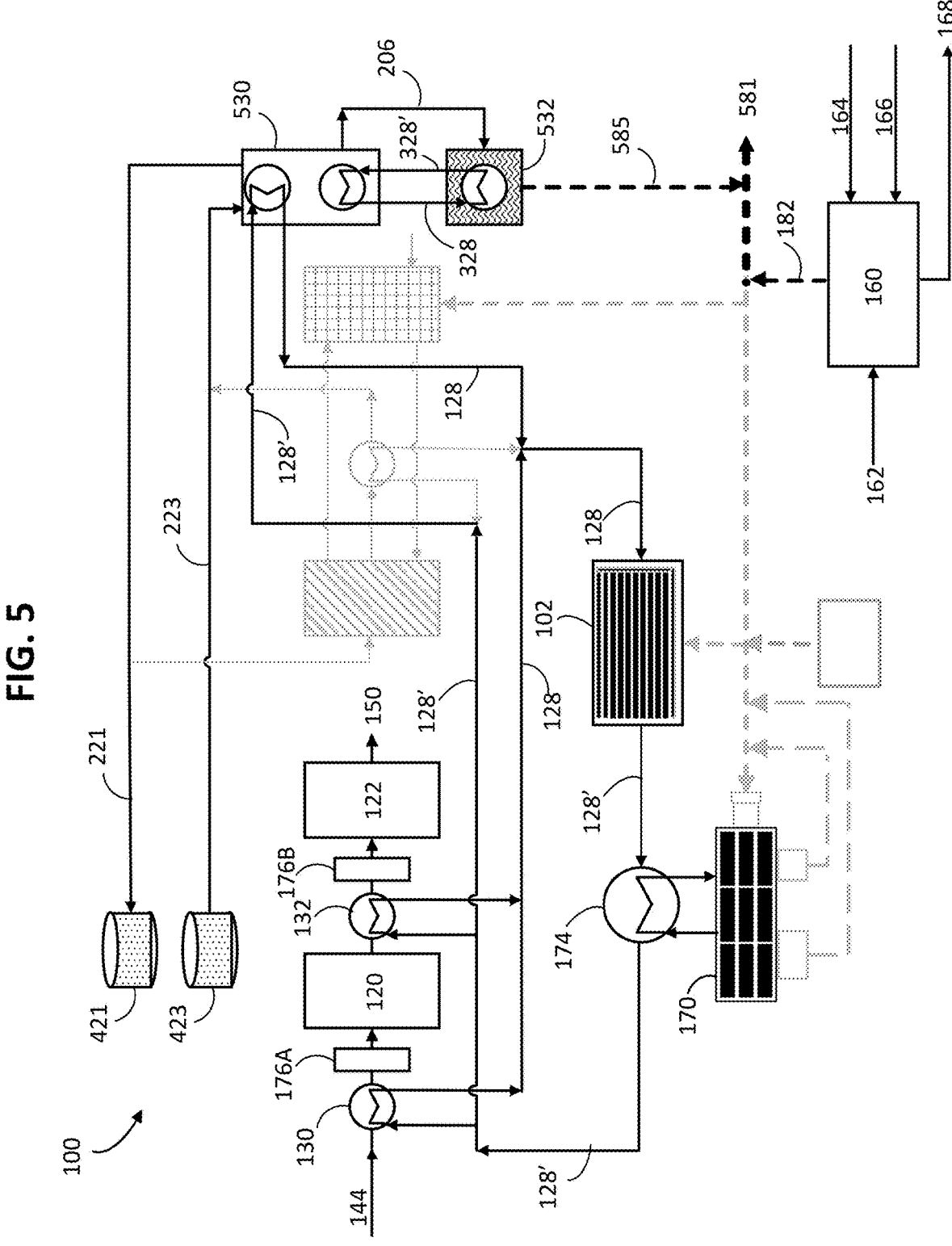
FIG. 5 shows an illustration of a CN hydrocarbon processing facility with internal apparatus, devices and processes being operated under the condition wherein there is a deficit of external green electricity available from the power grid and when the facility is operated independently from the grid for a period of time.

FIG. 5 illustrates embodiments of the present disclosure showing operation of a CN hydrocarbon processing facility 100 operated during periods of reduced electricity availability from the grid, with dashed lines and arrows representing the flow and relative direction of electricity, respectively, and solid black lines indicating the flow and relative direction of flow, respectively, of materials including liquid HTF, LOHC compounds, steam, water, hydrogen, hydrocarbon, and petroleum materials under operating conditions as disclosed in association with this figure. In contrast light gray lines and unit elements rendered in light gray shading indicate flows, processes and unit elements that are presently dormant under the operating conditions as disclosed in association with this figure.

FIG. 5 illustrates an embodiment of the present disclosure wherein the CN hydrocarbon processing facility 100 is operating during periods of reduced electricity availability from the grid, wherein it may continue to process hydrocarbon materials using stored energy in the form of chemical potential as available hydrogen within an R-LOHC liquid stored on site within a R-LOHC storage tank, or alternatively using stored thermal energy in the form of heat obtained from a heat storage means.

Accordingly, in one related embodiment all required electricity may generated using hydrogen generated internally by dehydrogenation of R-LOHC 223 obtained from R-LOHC storage tank 423 that is fed to the catalytic dehydrogenation unit 530 where it is dehydrogenated to produce internal hydrogen 206 and S-LOHC 221 which is returned to an S-LOHC storage tank 421 for later processing. The internal hydrogen 206 produced by the catalytic dehydrogenation unit 530, or alternatively another source of stored hydrogen (not shown), may be fed to fuel cell 532 which combines the produced hydrogen with oxygen, air, or oxygen enriched air to produce water 201 (not shown), which may be stored for use in other internal processes later, and to produce electricity 585, which can be exported to the electrical grid as green export electricity 581. In further embodiments, not shown in FIG. 5, excess produce electricity 585 may also be stored internally in an electric battery or fed to an ohmic heater to produce heat and stored as thermal energy within a heat storage means such as a thermal battery located with the facility or outside the facility. If additional dehydrogenation heat is required by unit 530, the required heat may be supplied by means of heated liquid HTF supplied by means of the HTF circulation loop 128' which draws heat from the heat storage means 170 using the stored heat exchanger 174 and transports it to the catalytic dehydrogenation unit 530, the return HTF circulation loop 128 then transporting the relatively cooler HTF fluid back to heat exchanger 174, either directly (not shown here) or through the optional electrical heater 102. In a related embodiment (not shown here), the electrical heater 102 may be engaged to heat the relatively cooler HTF fluid returning from the catalytic dehydrogenation unit 530 using electricity 585 from the fuel cell unit 532 or electricity from the electric battery 190. In addition, the internal HTF circulation loops 328 and 328' may be operated to maintain both units 530 and 532 at their desired temperatures for maximum operational efficiency.

In a further related embodiment shown in FIG. 5, electricity generated from the cogeneration unit 160 may also be used to supply internally generated electrical energy 182 for storage (not shown) or to the grid as export electricity 581, using available light petroleum gases 162 that are available in combination with waste hydrogen 164 and waste S-LOHC 166 (either from S-LOHC storage tank 421 or as diverted in part from the S-LOHC 221 output of the catalytic dehydrogenation unit 530 if it is in operation at the time).

The cogeneration unit 160 typically generates relatively small amounts of electricity and heat, and would not be considered a primary process for supplying electricity for the overall combined processes needed for operation of the CN hydrocarbon processing facility 100, but certainly may be used to provide supplemental internally generated electrical energy 182, thus improving the overall carbon neutral footprint of the CN hydrocarbon processing facility 100.

The catalytic dehydrogenation unit 530 and the fuel cell unit 532 may be separate units, as shown in FIG. 5 or components of a combined hydrogenation and electrolysis module 300 (see FIG. 3) that operates to achieve the same purpose of the separate units. In alternative embodiments, the fuel cell may be a regenerative fuel cell, being reversible in its operation as needed and having the capability of both generating an electric current in the presence of hydrogen, and of generating hydrogen in the presence of water and an electric current. When a SOFC is operated in regenerative (i.e., reversible) mode, the anode for the electricity production mode (fuel cell mode) becomes the cathode in the hydrogen generation mode (reverse fuel cell mode), and vice versa when operated in a normal fuel cell mode. When an external voltage is applied, water at the anode side will undergo electrolysis to form oxygen and protons, and the corresponding protons will be transported through the solid electrolyte to the cathode where they are reduced to form hydrogen. In this reverse mode, the polarity of the fuel cell is opposite to that polarity used for the fuel cell mode operation.

Accordingly, in these various embodiments of the disclosure, the internal processes and apparatus of the CN hydrocarbon processing facility 100 can be adapted, combined, and modified to use all available forms of internal energy to produce export electricity to the grid during periods of external electrical deficit, while continuing to operate as a hydrocarbon processing facility.

In the disclosed embodiments, during periods of external electrical deficit, as shown in FIG. 5, for example the first and second process units 120 and 122 may continue to utilize internally stored and generated thermal energy in the form of heated liquid HTF supplied to them by HTF circulation loop 128' by means of the first and second heat exchangers 130 and 132, respectively, optionally heated by means of supplemental combustion heaters 176A and 176B, respectively if needed, in order to process first and second process unit feedstocks 144 and 148, respectively. In a related embodiment for a serial operation as shown, the first process unit product 146 may be further processed directly within 122 as a second product feedstock 148 itself, being fed to the second process unit 122 for further immediate processing to produce second process unit products 150.

Heat Transfer Fluids

Suitable heat transfer fluids (HTFs) include those that are liquids at the desired operating temperatures disclosed herein. Also suitable are HTFs that have high flash points and vapor transition temperatures greater than the highest desired operating temperatures employed herein, so that they remain as liquids within the disclosed apparatus and systems. Also suitable are HTFs that are solids or semi-solids at room temperature conditions, but which are readily liquified by application of heat and are readily maintained as flowable and pumpable liquids over the disclosed operating temperatures employed herein. Also suitable are HTFs that remain liquids even below operating temperatures, so as to negate the need to preheat and melt the materials prior to pumping, and which can be suitable employed in lower temperature environments, yet possess stability and liquidity over the desired operating temperatures disclosed herein.

Some non-limiting examples of HTFs suitable for use herein include those available from Global Heat Transfer Ltd., Cold Meece Estate, Cold Meece, Stone, Staffordshire, ST15 OSP, United Kingdom such as Globaltherm Omnitech (15-400° C.), Globaltherm Omnistore MS-600 149-600° C.) and Globaltherm RP (–20-350° C.).

Other non-limiting examples include the Therminol brand of HTFs available from Eastman Chemical Company, 200 S. Wilcox Dr., Kingsport, Tenn. 37660 U.S.A., particularly Therminol 63, Therminol 66, Therminol 68, Therminol 72, Therminol 73, Therminol 74, Therminol 75 and Therminol VP-1, all stable up to temperatures of 600° C.

In general, suitable HTFs include those exhibiting a liquid phase fluid up to and including the operating temperature of the fuel cell elements, regardless of the specific chemical compositions and including mixtures and combinations thereof. Examples include mixtures of synthetic aromatics, such as Therminol 72, mixtures of terphenyl and quat-terphenyl, such as Therminol 75, and mixtures of diphenyl oxide (DPO) and biphenyl, such as Therminol VP-1, as cited hereinabove.

Other examples include one or a mixture of ionic liquids, such as 1-butyl-3-methylimidazolium tetrafluoroborate (C4mimBF4), available from IOLITE GmbH, Im Zukunftspark 9, 74076 Heilbronn, Germany and 1-butyl-3-methylimidazolium bistrifluoromethane sulflonimide (C4mimTf2N), available from Tokyo Chemical Industry Co., Ltd. (TCI), 9211 North Harborgate Street, Portland, Oreg. 97203, U.S.A.

Other examples include molten salts, such as mixtures of potassium nitrate and sodium nitrate and optionally sodium nitrite, and other known salt mixtures that are liquefiable and form a flowable liquid phase over the desired operating temperatures as disclosed herein. One non-limiting example is HITEC, available from Coastal Chemical Co., LLC, 1500 Post Oak Blvd., Suite 1300, Houston, Tex. 77056 U.S.A., which is a eutectic mixture of water-soluble, inorganic salts of potassium nitrate, sodium nitrite and sodium nitrate suitable as an HTF herein as it is fluid between about 150-600° C.).

Yet further examples include newer heat transfer materials referred to as High Operating Temperature (HOT) fluids, such as those being developed by the University of California, Los Angeles (UCLA), along with partners at the University of California, Berkeley, and Yale University, under the "2012 Multidisciplinary University Research Initiative (MURI): High Operating Temperature (HOT) Fluids" funding opportunity, being either metal alloys, or halide and oxy-halide eutectic systems being developed by University of Arizona along with partners at Arizona State University and Georgia Institute of Technology, both systems being liquefiable within the temperature ranges disclosed as suitable for use herein, and suitable for operating at temperatures in excess of 800° C.

LOHC Compositions and Products

In the embodiments of the present disclosure, the hydrogenated LOHC product from a hydrogenation step is a hydrogen-enriched R-LOHC product. A desirable objective for hydrogenation is to produce a fully hydrogenated product, such as for example, but not limited to methylcyclohexane (MCH) from hydrogenated toluene, or cyclohexane from benzene, when these component hydrocarbons are employed. However, the process will operate under conditions that chemically binds less than the maximum amount of labile hydrogen in the R-LOHC. In one embodiment, the hydrogen-enriched LOHC product (R-LOHC product) contains at least or greater than 5 wt % chemically bound labile hydrogen. In another embodiment, the R-LOHC product from hydrogenation contains at least or greater than 6 wt % chemically bound labile hydrogen.

The LOHC product suitable for use herein include hydrogenated organic substrates selected from mono- and polycyclic compounds, mono- and polycyclic heterocyclic compounds and homocyclic compounds, including both their saturated and unsaturated forms, including their fully hydrogenated, partially hydrogenated and fully dehydrogenated states depending on where within the process the LOHC product is being employed, enriched or harvested for labile hydrogen, as described in the various embodiments herein. The hydrogenated form of the LOHC releases chemically bound hydrogen via dehydrogenation, resulting in a fully or partially dehydrogenated form of the LOHC. Both the hydrogenated and dehydrogenated forms are liquids at standard temperature and pressure (STP, being 0° C. and 1 bar).

The LOHC materials suitable for use herein are characterized also as an LOHC pair, with an at least partially hydrogenated form of the LOHC (i.e., R-LOHC product) being predominately one member of the pair, while an at least partially dehydrogenated form of the LOHC (i.e., S-LOHC product) as the other member of the LOHC pair. LOHC pairs suitable for the present invention include monocyclic pairs such as benzene/cyclohexane and toluene/methylcyclohexane. Exemplary homopolycyclic LOHC pairs include the decalin/naphthalene and perhydro-benzyl toluene/benzyl toluene pairs. Exemplary heteropolycyclic LOHC pairs include the 1-methyl perhydro indole/1-methyl indole, 1,2-perhydrodimethyl indole/1,2-dimethyl indole, and perhydro dibenzyl toluene (18H-DBT)/dibenzyl toluene (OH-DBT) systems.

In one embodiment, toluene generated by dehydrogenation may be reversibly hydrogenated to methylcyclohexane without otherwise decomposing or otherwise degrading the underlying cyclic structure, being aromatic types of molecules or containing at least one aromatically convertible ring. Accordingly, as used herein, the resulting LOHC product may also be termed a "recyclable LOHC" product or R-LOHC.

The LOHC pair designation is thus fully represented by two interconvertible chemical structures, one being fully dehydrogenated and one being fully hydrogenated. By "fully dehydrogenated" is meant to indicate that all of the labile hydrogen atoms have been removed, leaving the resulting molecule in its aromatic substrate form. In the case of the toluene/MCH pair, the toluene molecule is the fully dehydrogenated species, having the aromatic substrate form. By "fully hydrogenated" is meant to indicate that all of the sites on the molecule available for labile hydrogen attachment are occupied, being the most fully hydrogen saturated form. In the case of the toluene/MCH pair, the MCH molecule is the fully hydrogenated species. Other examples include the benzene/cyclohexane pair or the decalin/naphthalene pair. In further embodiments, the R-LOHC representation for the hydrogenated form includes partially hydrogenated forms as well as the fully hydrogenated form, depending in part on the nature of the LOHC product feed at various stages of processing according to the disclosure methods herein. Likewise, the S-LOHC representation for the dehydrogenated form includes partially dehydrogenated forms, again depending in part on the nature of the LOHC product be used or processed as a LOHC product feed at various stages of the disclosed processes herein. It will be understood, therefore, in reference to a particular composition, method or process using the disclosed compositions, that the S-LOHC form will contain relatively fewer hydrogen atoms than the R-LOHC form in that exemplary process or composition. In one embodiment, the R-LOHC form contains greater than 5 wt % labile hydrogen that may be chemically removed by dehydrogenation, and the resultant S-LOHC form may contain less than 5 wt % labile hydrogen after use in one or more processes or in use to generate electricity or hydrogen in a usage application.

In these embodiments the LOHC, either in its R-LOHC or S-LOHC form may be in a purity of up to 100% with respect to available or labile hydrogen content. In alternative embodiments, the LOHC product may comprise at least about 80 wt % of a single LOHC species, or alternatively at least about 90 wt % of a single LOHC species, or alternatively a range from 90-99.9 wt % of a single LOHC species, or yet alternatively a range from 95 to 99 wt % of the LOHC species.

The S-LOHC feed suitable for use herein for supplying a hydrogenation reaction may be synthesized from conventional petroleum sources. At least a portion of the S-LOHC feed may be recovered as liquid phase recycle from a dehydrogenation reaction as described herein. In further embodiments, one or both of petroleum-based components and recycle S-LOHC based components may be present in the S-LOHC feed, in a ratio (1:1) from 100% petroleum-based to 100% recycle based component, or at any intermediate ratio. It will be generally desirable, for reasons of resource and energy utilization and environmental impact, to maximize the amount of recycle based component in the S-LOHC feed, with a petroleum component added as import feed to make up for any shortfall in recycle component availability. In such embodiments, the LOHC feed blend may contain more than 5% recycle, or alternatively in some situations a range from 10% to 95% recycle component.

Also suitable for tailored LOHC materials are mixtures of the disclosed materials, including for example, but not limited to a mixture of benzene, toluene, and xylene, in any ratio (BTX), and mixtures of any combination of the LOHC pairs disclosed hereinabove, in any ratio.

Hydrogenation

Suitable hydrogenation/dehydrogenation reactors and hydrogen production units suitable for use herein are well known in the art. The catalytic hydrogenation steps disclosed herein include passing the hydrogenation zone feedstocks in liquid or vapor phase over a suitable hydrogenation catalyst that is maintained at a temperature in a range of 200 to 300° C. and at a positive pressure of up to 20 bar. The hydrogenation catalyst may be powdered or in extrudate form. In one aspect, the catalyst may comprise a metal, such as platinum, palladium, nickel, cobalt, or a mixture thereof. The metal mixture may further be compounded with molybdenum. In related embodiments, the hydrogenation catalyst may comprise palladium, platinum, or a mixture thereof. The metal composition may be supported on an oxide material comprising, for example, alumina, silica, titania, or a mixture thereof in any ratio, or silica-alumina support having a surface area of greater than 150 m²/g. An additional component or alternative support may include an acidic zeolite with 10 or 12 Angstrom ring openings such as faujasite, Beta zeolite or ZSM-5. The hydrogenation catalyst composition may be sulfided prior to use. The hydrogenation reaction may be conducted in an existing refinery having suitable catalyst reaction and support facilities to produce the recyclable LOHC with a purity suitable for use in the present process.

In one embodiment, the catalyst is a particulate solid, comprising particulates in the form of irregular shaped particulates, powder particulates, cylindrical particulates, or spherical particulates, and having a diameter ranging from 0.1 mm to 5 mm. In one embodiment, reactor tubes through which the reacting fluid flows are coated on the inside surface of the tubes with a coating of a catalytic material.

Fuel Cells

Embodiments of the disclosed eco-refinery system may employ a fuel cell electrochemical device for converting generated hydrogen gas to electrical power. The fuel cell device generates electricity by conversion of chemical energy of the hydrogen fuel and air into electricity through a pair of redox reactions. Suitable fuel cells for use in may be selected from an alkaline fuel cell (AFC), a proton-exchange membrane fuel cell (PEMFC), a phosphoric acid fuel cell (PAFC), a molten carbonate fuel cell (MCFC), an oxide ceramic or solid oxide fuel cell (SOFC), or the like. All may be operated according to one or more of the embodied process steps using atmospheric oxygen obtained from the environment as an oxidizer gas, with the result that no storage of oxygen gas is required. In further embodiments, the fuel cell device may comprise one or more individual fuel cell units, operated either in serial or parallel mode as needed. The electrochemical conversion devices suitable for use herein for converting carbon-neutral hydrogen to electrical power may include a solid oxide fuel cell (SOFC) device operating in a temperature range 400-650°

C. Approximately 30-35% of the energy generated in the SOFC is thermal energy that is suitable for at least partially maintaining the dehydrogenation reaction zone temperature and suitable for capture and redirection by means of HTF to other process units within the eRefinery. Gases exhausted from the anode side of the SOFC system include unreacted hydrogen and a small amount of S-LOHC that may be carried along with hydrogen feed to the SOFC from a dehydrogenation zone. In another embodiment, gases exhausted from the cathode side of the SOFC system, including oxygen depleted air and water vapor, may be combined with the anode exhaust stream in a catalytic conversion unit, which produces water, oxygen depleted air and $CO_2$ from aromatic liquid oxidation. An R-LOHC feed blend for use with the SOFC device may be contain in a range of 0.1-10 wt % of a secondary R-LOHC component in order to maintain the overall carbon-neutral process.

Additional suitable electrochemical conversion devices for converting carbon-neutral hydrogen to electrical power may include a proton-exchange membrane fuel cell (PEMFC) operating in a temperature range 50-100° C. Only a small portion, if any, of the heat generated by a PEMFC may be available for use with the dehydrogenation reaction zone. The remaining heat for dehydrogenation when employing a PEMFC fuel cell device may in one embodiment be provided by combustion of a portion of the combustion liquid. In this case, an R-LOHC feed blend for use with the PEMFC unit may contain in a range of 0.1-25 wt %, or alternatively 0.5-15 wt %, or alternatively 1-10 wt % of a secondary R-LOHC feed component in order to maintain the overall carbon-neutral process. In further embodiments the LOHC materials and R-LOHC in particular are derived from renewable sources including carbon-neutral sources and environmentally friendly sources of carbon and hydrogen.

The electricity generated in the fuel cell electrochemical device may be used internally for heat or propulsion, or exported to the electrical grid. Export electricity is important for compensating for reduced generation rates from renewable energy that supplies the electrical grid.

In one embodiment, the electrochemical cell may serve a dual purpose as an electrolyzer under electrolysis conditions and as a fuel cell under fuel cell conditions. Under electrolysis conditions, an electric current is passed to the cell that is in contact with water or an aqueous solution to generate hydrogen. Under fuel cell conditions, purified hydrogen is supplied to the anode of the fuel cell and oxygen, generally as air or an oxygen-enriched air stream, is supplied to the cathode. In embodiments employing dual purpose cells, electricity generated in the electrochemical conversion reaction may be passed from the fuel cell to an external circuit. Dual purpose proton exchange membrane cells operate as an electrolysis cell (PEMEC) and as a fuel cell (PEMFC) at temperatures of generally less than 100° C. and often in a range of 50-80° C., though experimental versions that operate at higher temperatures are known in the art. Dual purpose solid oxide cells operate as an electrolysis cell (SOEC) and as a fuel cell (SOFC) at temperatures of generally 500-850° C., though experimental versions that operate at lower temperatures are known.

A solid oxide electrolyzer cell (SOEC) is a solid oxide fuel cell that runs in regenerative mode to achieve the electrolysis of water by using for example, but not limited to a solid oxide, or ceramic electrolyte. The electrolysis reaction proceeds with the oxidation of water occurring at the anode and reduction of water occurring at the cathode to produce hydrogen gas and oxygen. Solid oxide electrolyzer cells typically operate at temperatures between 400 and 850° C. Suitable SOEC electrolysis systems are well known in the art.

While specific embodiments of the invention have been shown, described, and disclosed here in detail to illustrate the application of the principles of the invention, it will be understood that the invention may be embodied otherwise without departing from such principles.

We claim:

1. A method of operating a hydrocarbon processing facility comprising the steps of:
   (a) obtaining a source of import electricity from an electrical utility grid;
   (b) converting said import electricity to heat by means of ohmic conversion;
   (c) storing said heat as thermal energy within a heat storage means, wherein said heat storage means comprises at least a heat transfer fluid (HTF) and thermal battery; and
   (d) using said thermal energy as a heat source to power the operation of a plurality of hydrocarbon processing units,
   wherein said thermal energy is communicated to said plurality of hydrocarbon processing units by means of:
   (e1) heating a liquid HTF by means of the thermal battery to produce a heated HTF, wherein said heating is done by means of a stored heat exchanger associated with said thermal battery;
   (e2) conducting said heated HTF to said plurality of hydrocarbon processing units by means of a plurality of heat transfer loops associated with said stored heat exchanger;
   (e3) transferring said thermal energy between said liquid HTF and said hydrocarbon processing units to release heat by means of a plurality of heat exchangers associated with said processing units; and
   (e4) returning a cooler liquid HTF to said thermal battery by means of a second plurality of heat transfer loops; wherein said cooler liquid HTF is reheated to a higher temperature using said thermal energy stored within said thermal battery by means of said stored heat.

2. The method according to claim 1, wherein said source of import electricity is electricity derived from a renewable resource selected from geothermal, hydrothermal, hydroelectric, solar, wind, nuclear fusion, nuclear fission, wave action, and combinations thereof.

3. The method according to claim 2, wherein said import electricity is green energy electricity obtained from an environmentally friendly, carbon neutral process that does not release carbon dioxide to the environment.

4. The method according to claim 2, wherein said source of import electricity is used in part to convert an unloaded liquid organic hydrogen carrier (S-LOHC) into a labile hydrogen loaded liquid organic hydrogen carrier (R-LOHC) as a means of storing said import electricity in the form a liquid chemical battery while simultaneously generating thermal energy in the form of heat that is stored in said heat storage means by means of said heat transfer fluid.

5. The method according to claim 4, wherein said labile hydrogen loaded liquid organic hydrogen carrier (R-LOHC) is dehydrogenated within a catalytic dehydrogenation unit using said stored thermal energy to provide a source of hydrogen gas that is catalytically oxidized within a fuel cell unit to produce an unloaded liquid organic hydrogen carrier (S-LOHC) and water while simultaneously generating a source of green electricity that may be returned to said electrical utility grid.

6. The method according to claim 1, wherein said thermal energy is generated internally at least in part by at least one of said processing units by means of heat released during the catalytic hydrogenation of an unloaded liquid organic hydrogen carrier (S-LOHC).

7. The method according to claim 6, wherein said catalytic hydrogenation is conducted by means of an exothermic reaction conducted within a catalytic hydrogenation unit that combines hydrogen with said unloaded LOHC to produce a labile hydrogen loaded liquid organic hydrogen carrier (R-LOHC).

8. The method according to claim 1, wherein said thermal energy is generated internally at least in part by means of heat released during the electrochemical oxidation of hydrogen conducted within an electrochemical fuel cell.

9. The method according to claim 8, wherein the source of said hydrogen is hydrogen gas recovered from the catalytic dehydrogenation of a loaded liquid organic hydrogen carrier (R-LOHC) obtained by means of a dehydrogenation reaction conducted in a catalytic dehydrogenation unit.

10. The method according to claim 8, wherein the source of said hydrogen is hydrogen gas recovered from the electrolysis of water obtained by means of an electrolysis reaction conducted within a catalytic electrolysis cell using a source of green electricity.

11. The method according to claim 1, wherein the source of said thermal energy is heat captured by means of heat transfer to a liquid HTF by means of a heat exchanger in thermal communication with a heated liquid or gaseous effluent emanating from a fuel cell, hydrolysis cell, cooling tower, steam vent, catalytic hydrogenation cell, catalytic electrolysis cell, furnace, waste heat stream, heated exhaust stream, and combinations thereof.

12. The method according to claim 1, wherein said heat transfer fluid (HTF) is a material that is chemically stable, liquid and flowable over the operating temperature ranges of any one of the said processing units.

13. The method according to claim 1, wherein said means of ohmic heating is selected from dielectric heating, Joule heating, resistive heating, resistant heating, inductive heating, radiative heating, microwave heating, electromagnetic heating, thermoelectric heating, and combinations thereof.

14. The method according to claim 1, wherein byproducts of any one of said plurality of processing units are released or used internally in the operation of said hydrocarbon processing facility; wherein said byproducts are selected from carbon oxides including carbon dioxide, hydrogen, hydrocarbons, oxygen, petroleum compounds, water, and combinations thereof.

15. The method according to claim 1, wherein all steps conducted in the operation of said hydrocarbon processing facility are carbon neutral operations that are deemed to be in compliance with the requirements of all Scope 1 provisions of the 2016 Paris Agreement.

16. The method according to claim 1, wherein all materials and services used in steps conducted in the operation of said hydrocarbon processing facility are carbon neutral and are deemed to be in compliance with the requirements of all Scope 2 provisions of the 2016 Paris Agreement.

17. The method according to claim 1, wherein products of any one of said plurality of processing units produced in the operation of said hydrocarbon processing facility are carbon neutral carbon products that are deemed to be in compliance with the requirements of all Scope 3 provisions of the 2016 Paris Agreement.

18. A method of operating a hydrocarbon processing facility comprising the steps of:

(a) obtaining a source of import electricity from an electrical utility grid;

(b) converting said import electricity to heat by means of ohmic conversion;

(c) storing said heat as thermal energy within a heat storage means, wherein said heat storage means comprises at least a thermal battery; and (d) using said thermal energy as a heat source to power the operation of a plurality of hydrocarbon processing units;

wherein said thermal energy is distributed between said heat storage means and said hydrocarbon processing units by means of a heat transfer fluid (HTF);

wherein said supply of thermal energy is provided to any one of said hydrocarbon processing units by means of a heated heat transfer fluid (HTF) that is maintained in thermal communication with said hydrocarbon processing units and the thermal battery by means of a plurality heat exchangers associated with a plurality of HTF transfer loops bearing said heat transfer fluid, optionally with the aid of a plurality of pumps;

wherein said heat transfer fluid (HTF) is a material that is chemically stable, liquid and flowable over the operating temperature ranges of any one of the said processing units; and wherein said hydrocarbon processing facility is a conventional petroleum processing facility that has been retrofitted to operate as a carbon neutral facility by means of replacing hydrocarbon burning equipment selected from furnaces, heat generators, internal combustion engines, electric power generators, steam generators, and any process equipment that releases carbon oxides to the environment during their operation with a carbon neutral energy source providing the equivalent supply of electricity and thermal energy by means of a carbon neutral process providing said supply of electricity and thermal energy derived from a source of green energy.

19. A method of operating a hydrocarbon processing facility comprising the steps of:

(a) obtaining a source of import electricity from an electrical utility grid;

(b) converting said import electricity to heat by means of ohmic conversion;

(c) storing said heat as thermal energy within a heat storage means, wherein said heat storage means comprises at least a heat transfer fluid (HTF) and thermal battery; and (d) using said thermal energy as a heat source to power the operation of a plurality of hydrocarbon processing units, wherein said supply of thermal energy is provided to any one of said hydrocarbon processing units by means of a heated heat transfer fluid (HTF) that is maintained in thermal communication with said hydrocarbon processing units and the thermal battery by means of a plurality of heat exchangers associated with a plurality of HTF transfer loops bearing said heat transfer fluid, optionally with the aid of a plurality of pumps; wherein said heat transfer fluid (HTF) is a material that is chemically stable, liquid and flowable over the operating temperature ranges of any one of the said processing units.

* * * * *